United States Patent
Shepherd et al.

(10) Patent No.: US 10,056,078 B1
(45) Date of Patent: Aug. 21, 2018

(54) OUTPUT OF CONTENT BASED ON SPEECH-BASED SEARCHING AND BROWSING REQUESTS

(71) Applicant: Amazon Technologies, Inc., Seattle, WA (US)

(72) Inventors: Benjamin Lee Shepherd, Issaquah, WA (US); Joe Virgil Fernandez, Seattle, WA (US); Vijayabaskar Gangadaran, Issaquah, WA (US); Mallory Ann McManamon, Seattle, WA (US); Peter Van Tuyl Bentley, Seattle, WA (US); Shailesh Srivastava, Bellevue, WA (US)

(73) Assignee: Amazon Technology, Inc., Seattle, WA (US)

( * ) Notice: Subject to any disclaimer, the term of this patent is extended or adjusted under 35 U.S.C. 154(b) by 0 days.

(21) Appl. No.: 15/195,048

(22) Filed: Jun. 28, 2016

(51) Int. Cl.
*G10L 15/22* (2006.01)
*H04N 21/482* (2011.01)
*H04N 21/454* (2011.01)
*H04N 21/45* (2011.01)
*H04N 21/472* (2011.01)
(Continued)

(52) U.S. Cl.
CPC .......... *G10L 15/22* (2013.01); *G06F 17/3053* (2013.01); *G06F 17/30864* (2013.01); *G06Q 20/12* (2013.01); *G06Q 20/36* (2013.01); *G10L 15/26* (2013.01); *H04B 11/00* (2013.01); *H04N 21/42203* (2013.01); *H04N 21/437* (2013.01); *H04N 21/454* (2013.01); *H04N 21/4532* (2013.01); *H04N 21/47217* (2013.01); *H04N 21/4826* (2013.01); *H04N 21/4828* (2013.01); *G10L 2015/221* (2013.01)

(58) Field of Classification Search
CPC ... G10L 15/22; G10L 15/26; G10L 2015/221; H04N 21/4532; H04N 21/437; H04N 21/42203; H04N 21/4826; H04N 21/47217; H04N 21/4828; H04N 21/454; G06Q 20/12; G06Q 20/36; G06F 17/30864; H04B 11/00
See application file for complete search history.

(56) References Cited

U.S. PATENT DOCUMENTS 8,892,446 B2 * 11/2014 Cheyer ............... G06F 17/3087
704/246

OTHER PUBLICATIONS

Jordan Kahn, Apple unveils its all-new Apple TV, here's what you need to know, Sep. 2015, 9to5mac.com, https://9to5mac.com/2015/09/09/new-apple-tv-fourth-gen-specs-features/.*
(Continued)

*Primary Examiner* — Hoang Vu A Nguyen Ba
(74) *Attorney, Agent, or Firm* — Pierce Atwood LLP

(57) ABSTRACT

Speech-controlled searching and browsing for content using speech-controlled devices, or other input-limited devices, is described. A user may audibly indicate to a speech-controlled device whether the user wants to search or browse for content, along with a topic of the content/results to be retrieved. A server, located remotely from the speech-controlled device determines an appropriate endpoint device for displaying results of the requested search or browse. The server also determines an appropriate content source for the requested content, and sends a request for the content to the content source. The server receives search or browse results from the content source and forwards them to the determined endpoint device.

20 Claims, 20 Drawing Sheets

(51) Int. Cl.
　　　*H04N 21/422*　　(2011.01)
　　　*G10L 15/26*　　(2006.01)
　　　*H04N 21/437*　　(2011.01)
　　　*G06Q 20/12*　　(2012.01)
　　　*H04B 11/00*　　(2006.01)
　　　*G06F 17/30*　　(2006.01)
　　　*G06Q 20/36*　　(2012.01)

(56) References Cited

OTHER PUBLICATIONS

Wikipedia, Roku, Oct. 3, 2017, https://en.wikipedia.org/wiki/Roku.*
Amazon.com, Roku 1 Streaming Media Player (2710R), Oct. 3, 2017, https://www.amazon.com/Roku-Streaming-Media-Player-2710R/dp/B00F5NB7JK.*
Apple Support, Use Siri on your Apple TV 4K or Apple TV (4th generation)—Apple Support, Oct. 3, 2017, https://supportapple.com/en-us/HT205300.*

\* cited by examiner

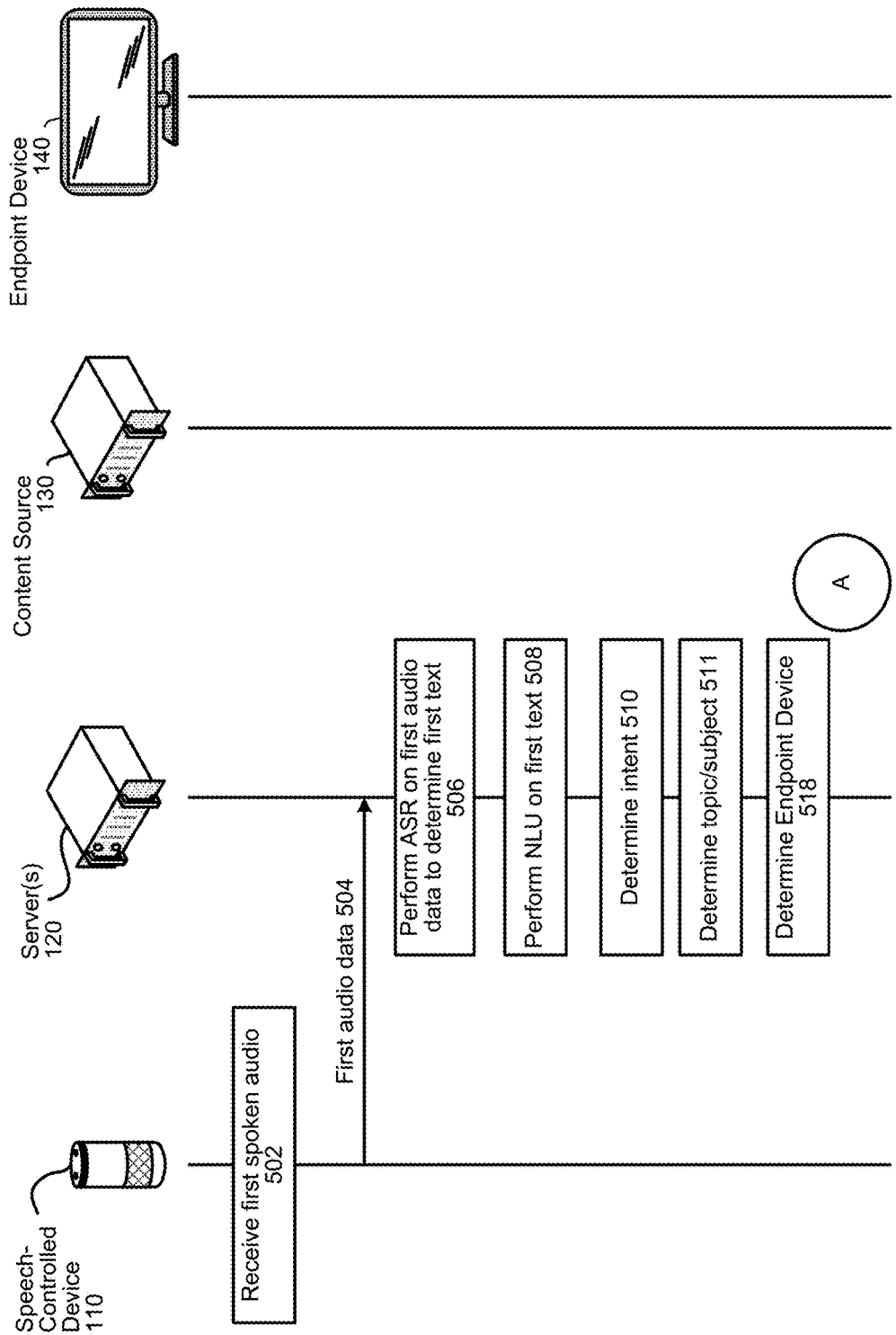

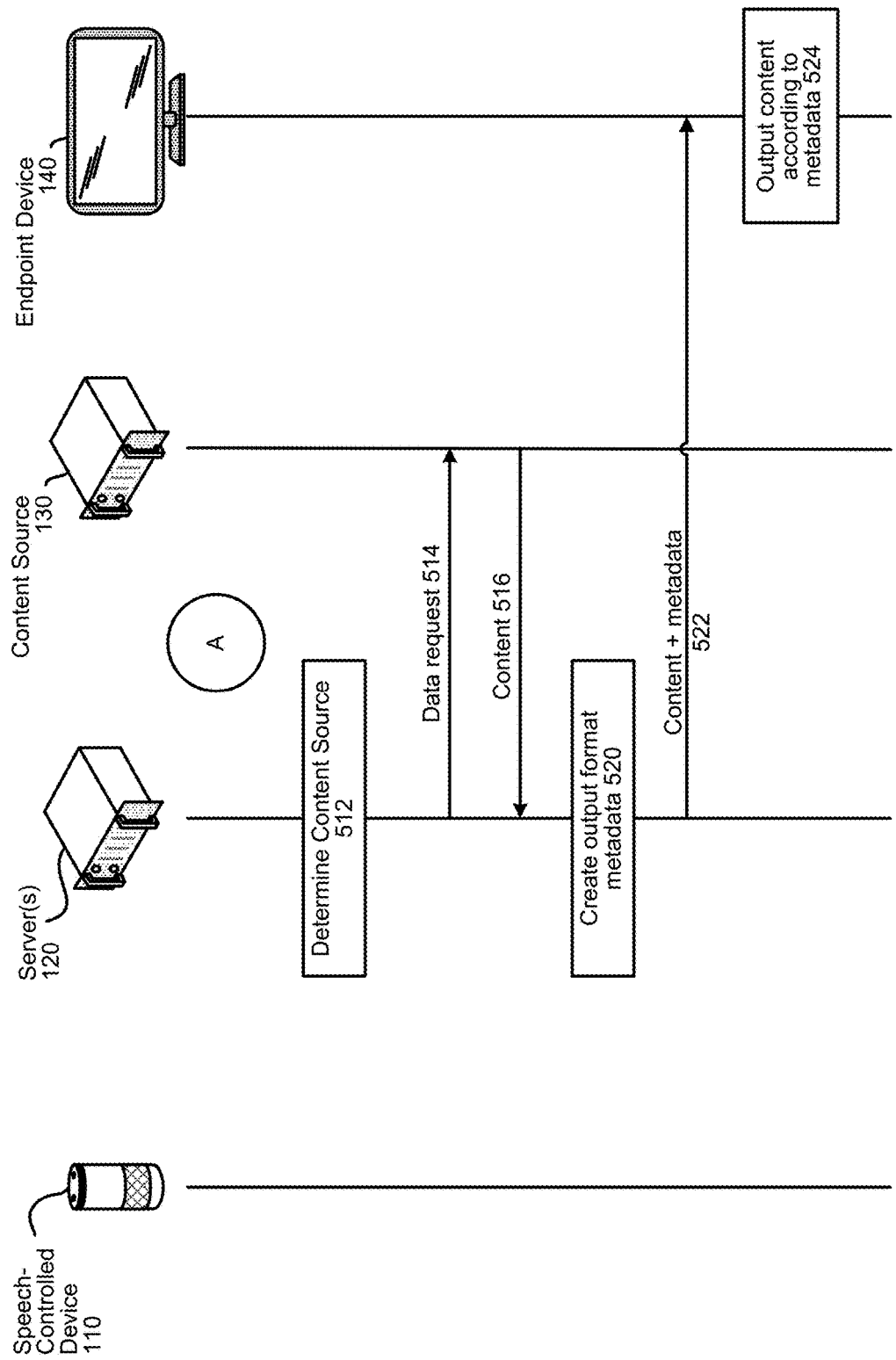

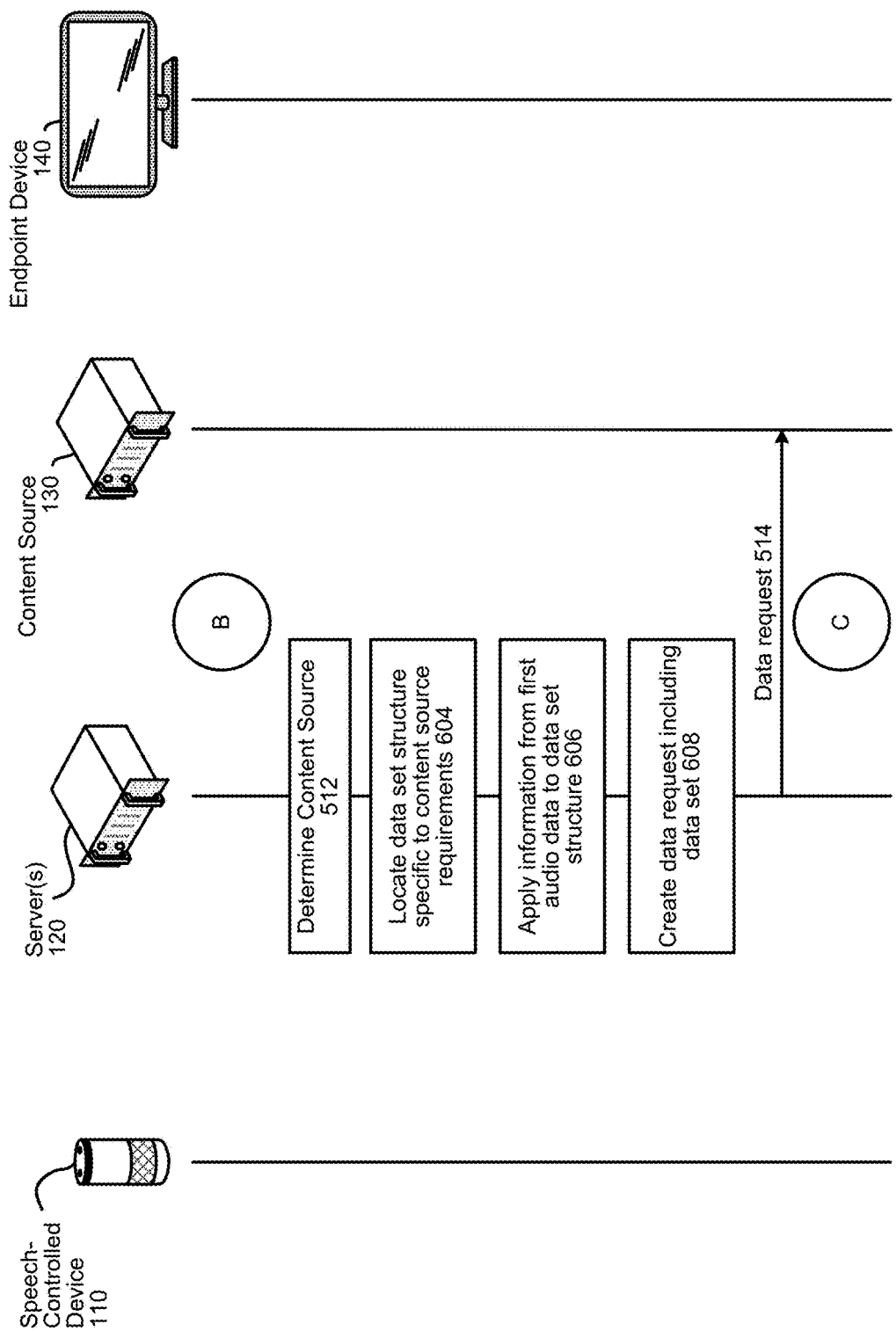

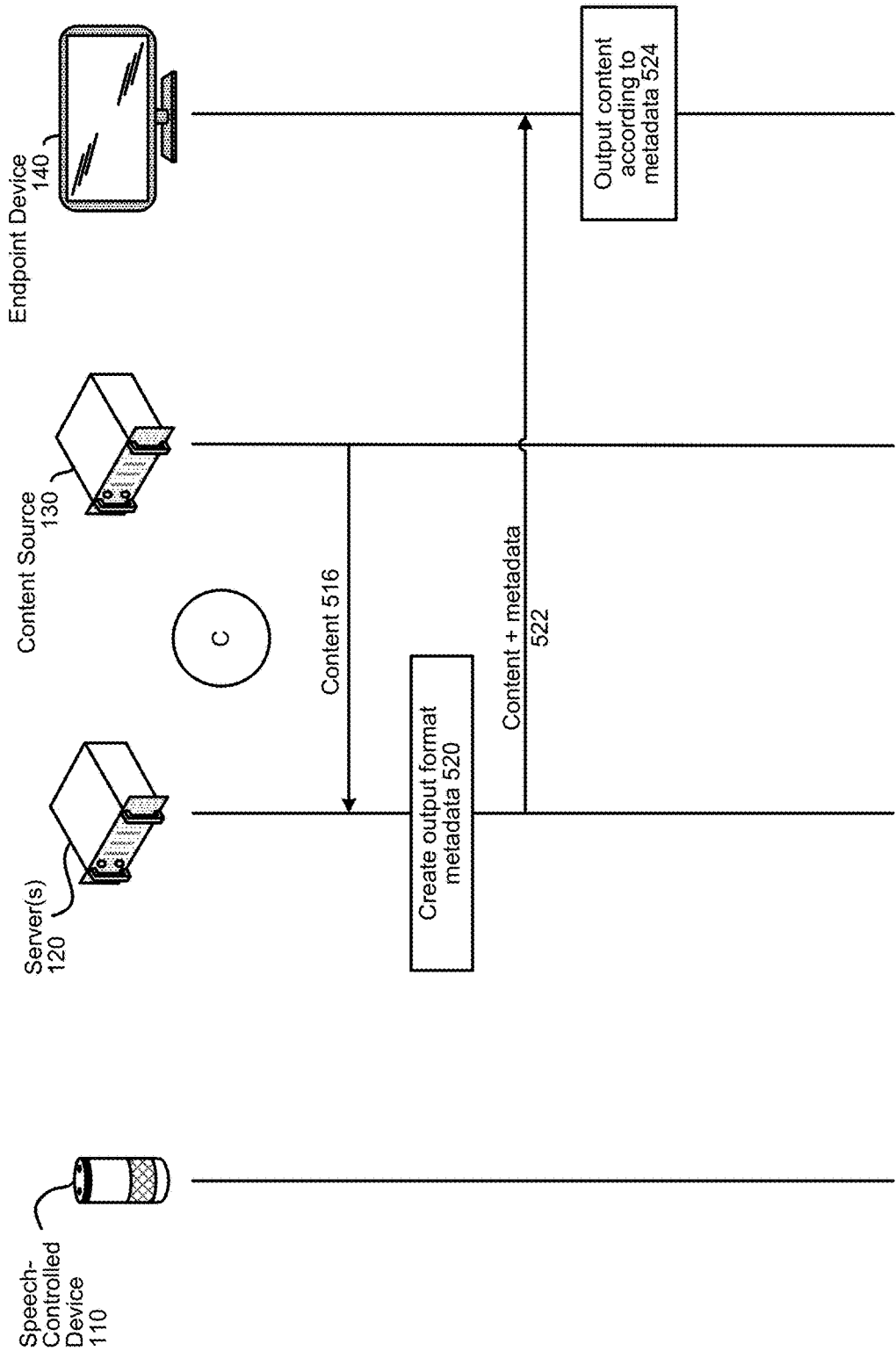

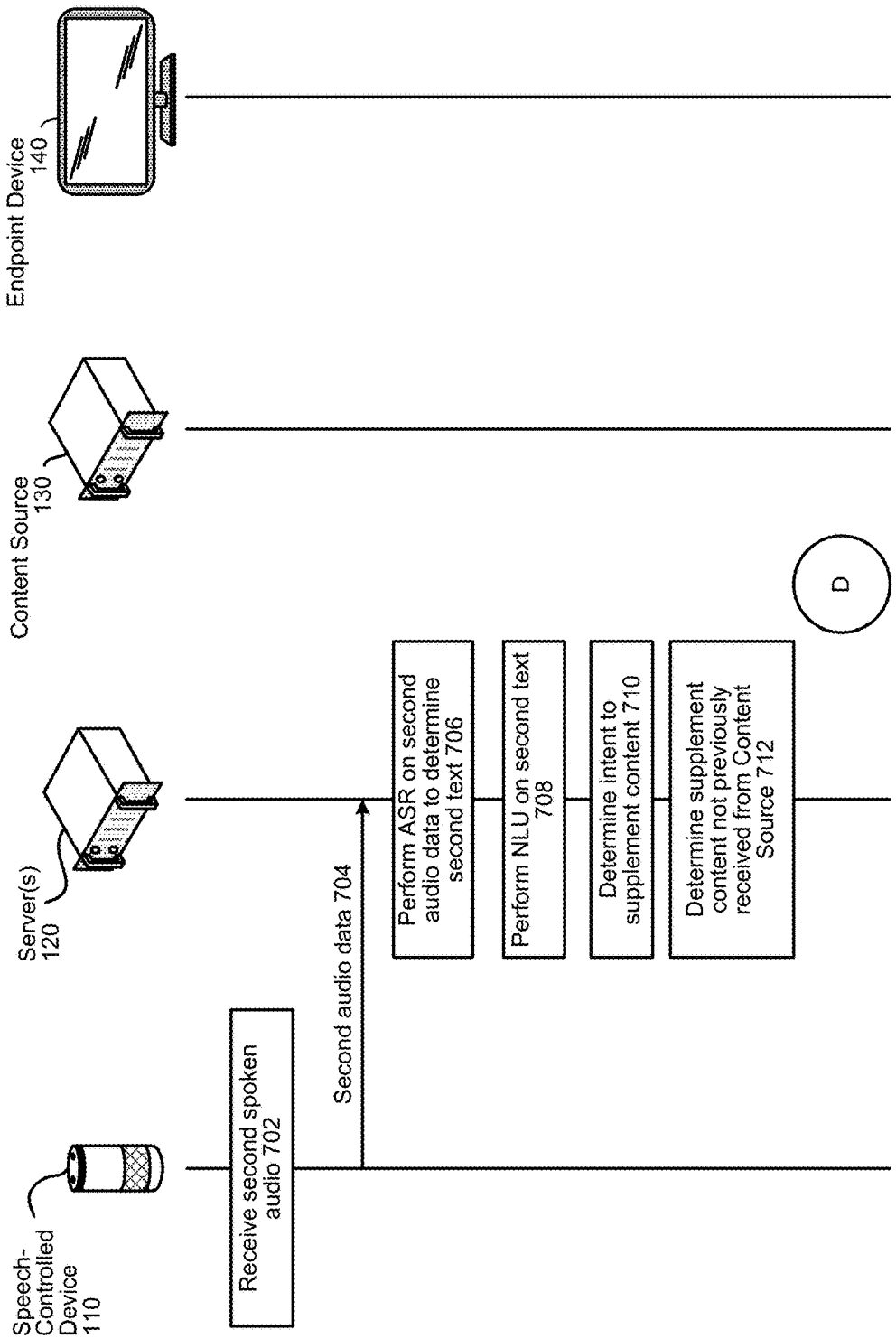

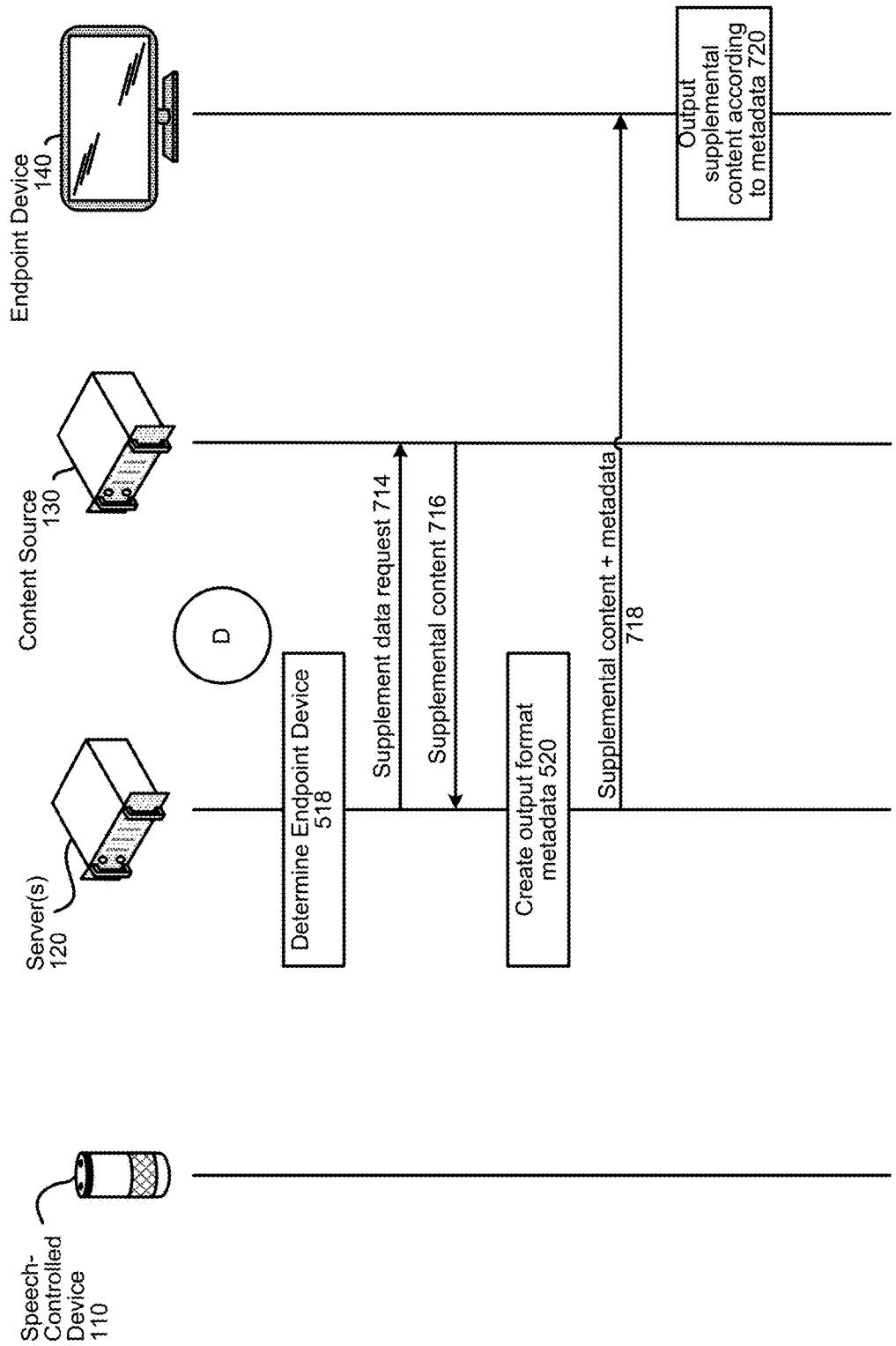

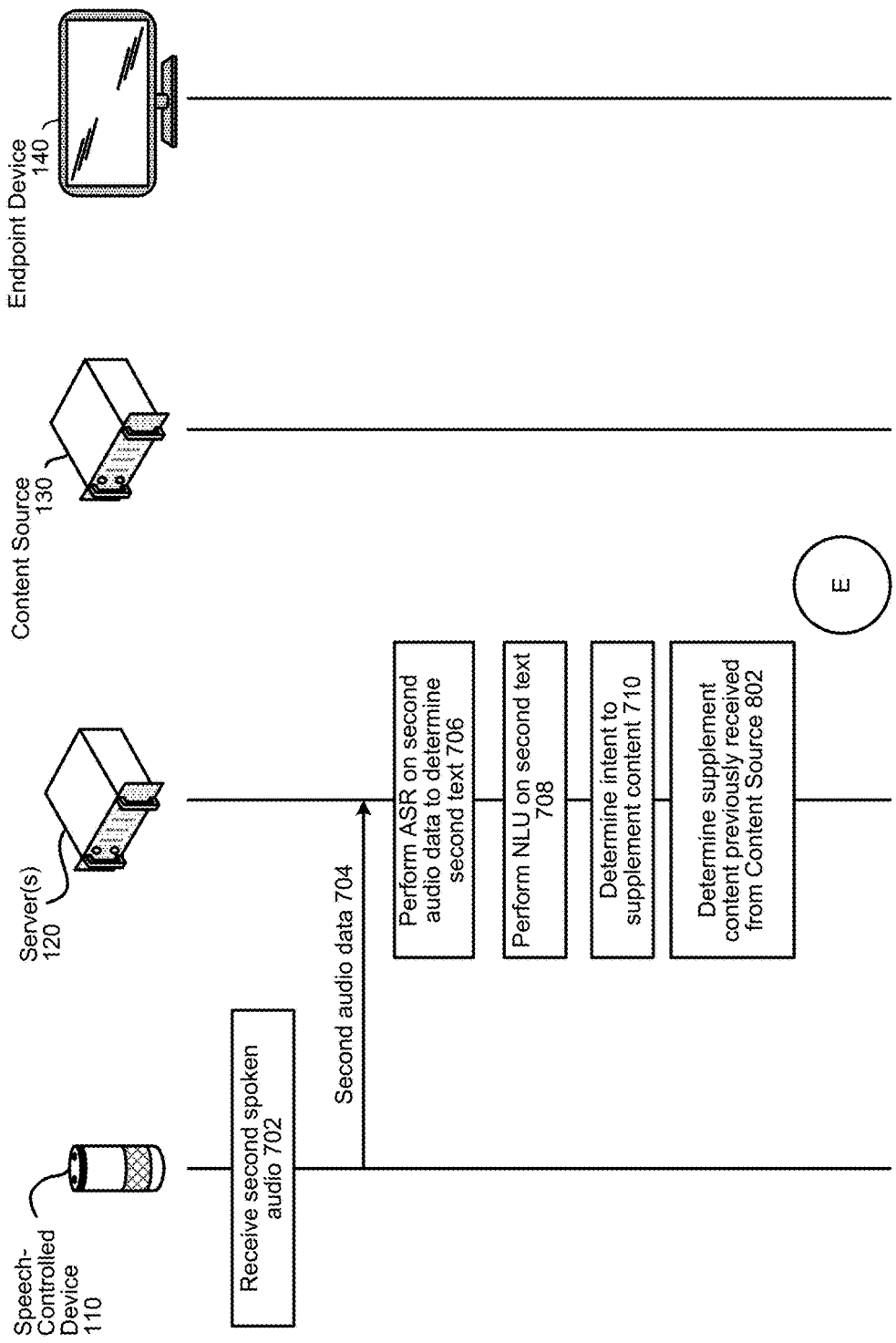

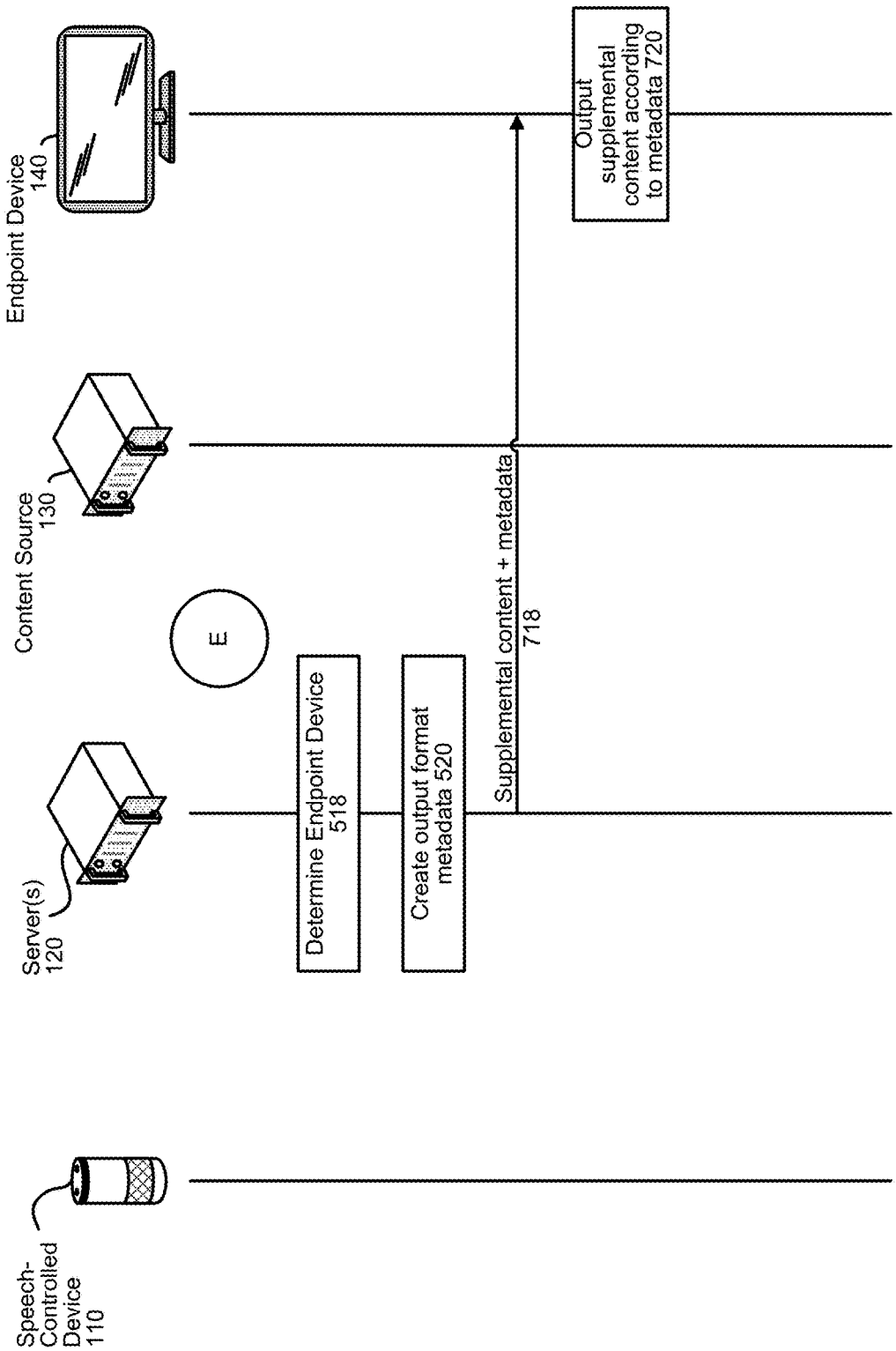

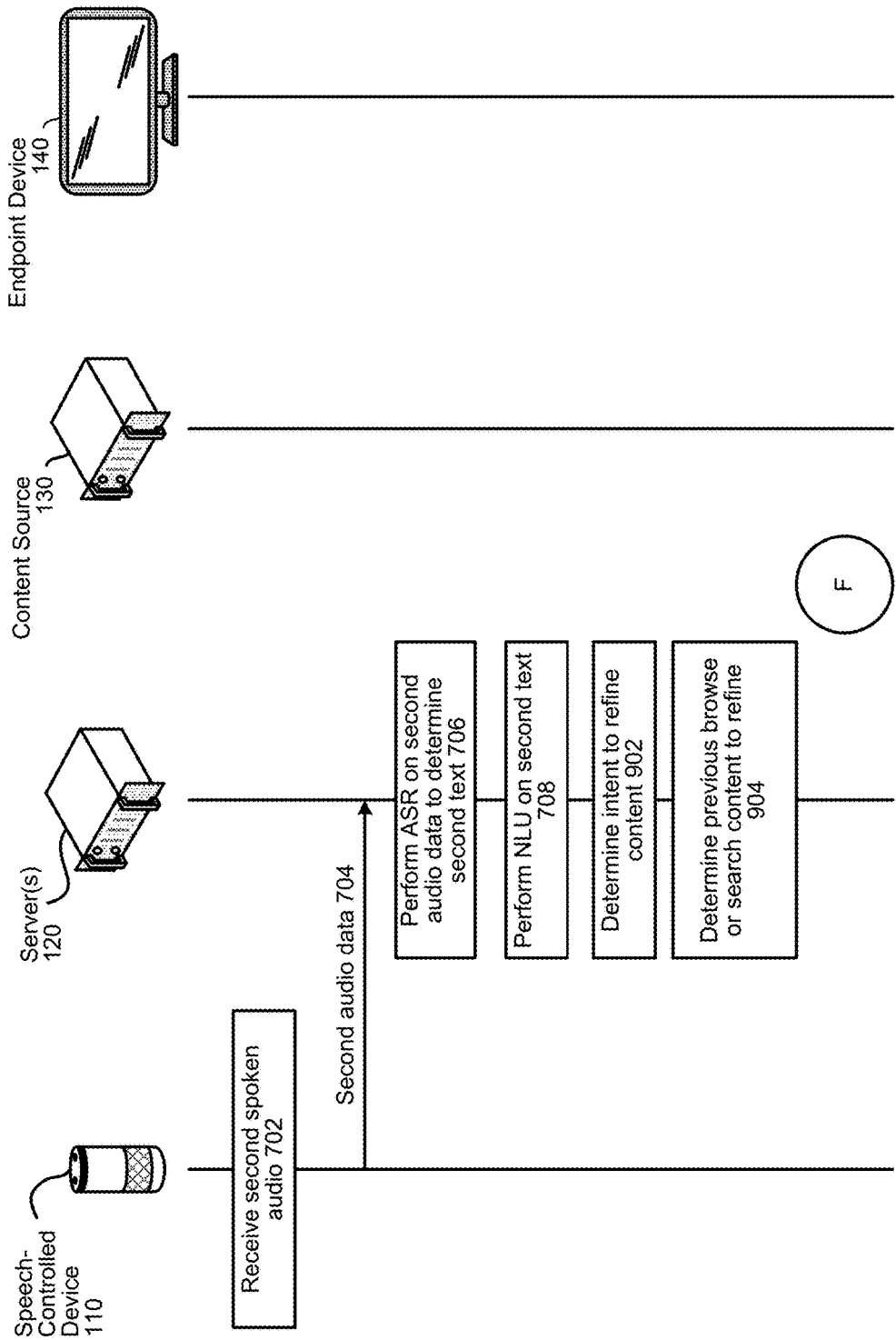

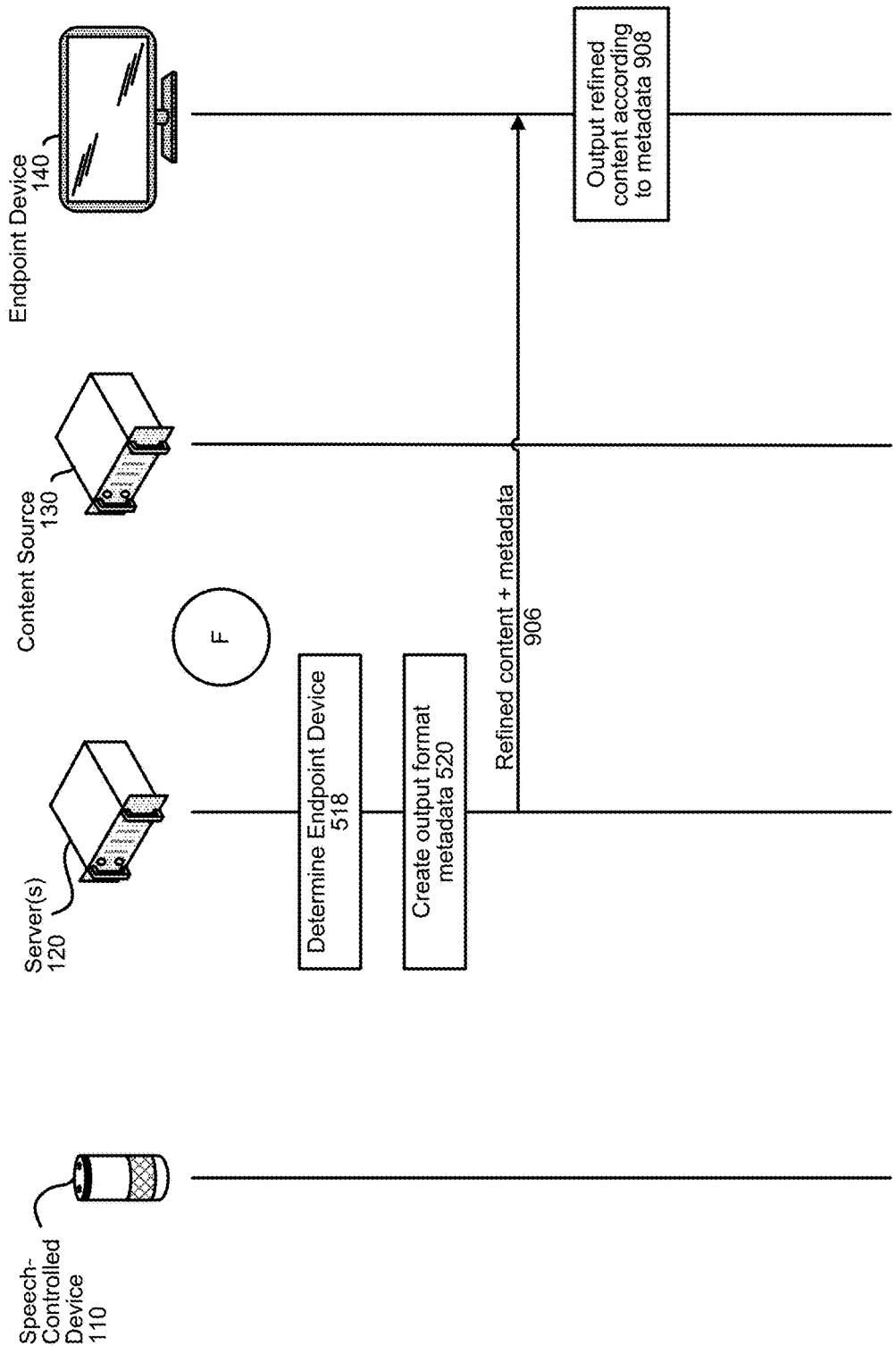

US 10,056,078 B1

OUTPUT OF CONTENT BASED ON SPEECH-BASED SEARCHING AND BROWSING REQUESTS

BACKGROUND

Speech recognition systems have progressed to the point where humans can interact with computing devices by relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 5A and 5B are a signal flow diagram illustrating speech-controlled searching and browsing according to embodiments of the present disclosure.

FIGS. 6A through 6C are a signal flow diagram illustrating speech-controlled searching according to embodiments of the present disclosure.

FIGS. 7A and 7B are a signal flow diagram illustrating speech-controlled supplemental searching or browsing according to embodiments of the present disclosure.

FIGS. 8A and 8B are a signal flow diagram illustrating speech-controlled supplemental searching or browsing according to embodiments of the present disclosure.

FIGS. 9A and 9B are a signal flow diagram illustrating speech-controlled refinement of search or browse content according to embodiments of the present disclosure.

DETAILED DESCRIPTION

Figure 1:
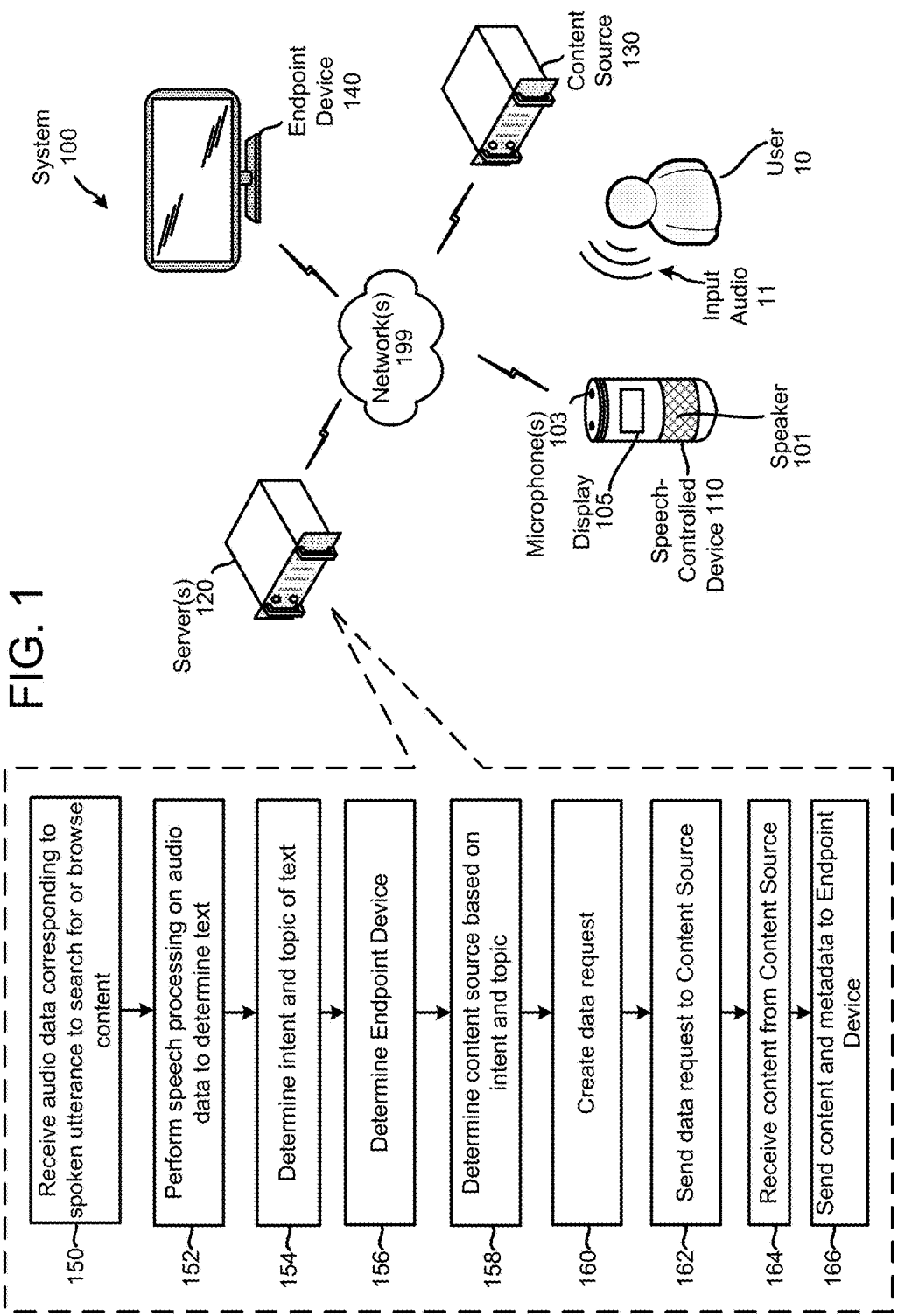
FIG. 1 illustrates a system for speech-controlled searching and browsing in an automatic speech recognition (ASR) system according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

While executing certain commands using speech may be reasonably straightforward (for example, playing music), other commands, particularly those that involve a visual medium, may be more difficult. For example, a user of a device may be used to search and browse for content using a mouse, keyboard, and/or touchscreen where the user provided tactile input to a system (through the above input components) and typically received output through a visual display. With such traditional searching and browsing being limited to tactile input and visual output, data tree structures were often used to group and display content. Data tree structures are costly to build and maintain. With computing devices becoming more complex and sophisticated, comprehensive and individualized content searching and browsing is possible without the use of expensive data trees and without being limited to tactile user input or visual data output. In particular, new ways of organizing content may be more appropriate for speech controlled systems.

The present disclosure provides techniques for searching and browsing for content using speech-controls. A user may audibly indicate to a speech-controlled device whether the user wants to search or browse for content, along with a topic of the content/results to be retrieved. A server, located remotely from the speech-controlled device may perform processes to determine an appropriate content source for the requested content, and may send a request for the content to the source. The system of the present disclosure may be easy to scale/implement with a variety of programs and application program interfaces ("APIs") to coordinate interaction between a speech processing system and different input points or output points connected to the system. Moreover, since programs (i.e., content sources) need not be specially configured to be implemented with the presently disclosed system, programs can be configured to programmer desires while remaining implementable within the present system.

As part of outputting results of a speech command, the server also determines an appropriate endpoint device for displaying results of the requested search or browse. For example, the search or browse results may be displayed on the speech-controlled device if the speech-controlled device has a display. Alternatively, the search and browse results may be displayed on a display physically separate from, though potentially still proximate to, the speech-controlled device. For example, the server may identify a television to display the search results called for in a user utterance captured by a speech-controlled device in the same room as the television. Thus, the presently disclosed system may be endpoint device agnostic.

FIG. 1 shows a system 100 configured to search for and browse content using a speech-controlled device. Although FIG. 1, and lower figures/discussion, illustrate the operation of the system 100 in a particular order, the steps described may be performed in a different order (as well as certain steps removed or added) without departing from the intent of the disclosure. As shown in FIG. 1, the system 100 may include one or more devices 110 local to a user(s) 10, as well as one or more networks 199 and one or more servers 120 connected to device 110 across network(s) 199. The server(s) 120 (which may be one or more different physical devices) may be capable of performing traditional speech processing (such as ASR, NLU, query parsing, etc.) as described herein. A single server 120 may be capable of performing all speech processing or multiple server(s) 120 may combine to perform the speech processing. Further, the server(s) 120 may be configured to execute certain commands, such as answering queries spoken by the user 10. In addition, certain speech detection or command execution functions may be performed by the device 110.

As shown in FIG. 1, the user 10 may speak an utterance (represented by input audio 11) including a query to a speech-controlled device 110. The input audio 11 may be captured by one or more microphones 103 of the device 110 and/or a microphone array (not illustrated) separated from the device 110. The microphone array may be connected to the device 110 such that when the input audio 11 is received by the microphone array, the microphone array sends audio data corresponding to the input audio 11 to the device 110. Alternatively, the microphone array may be connected to a companion application of a mobile computing device (not illustrated), such as a smart phone, tablet, etc. In this example, when the microphone array captures the input audio 11, the microphone array sends audio data corresponding to the input audio 11 to the companion application, which forwards the audio data to the device 110. If the device 110 captures the input audio 11, the device 110 may convert the input audio 11 into audio data and send the audio data to the server(s) 120. Alternatively, if the device 110 receives audio data corresponding to the input audio 11 from the microphone array or companion application, the device 110 may simply forward the received audio data to the server(s) 120.

In any event, the server 120 receives audio data corresponding to the input audio 11 (illustrated as 150). The server 120 then performs speech processing (e.g., ASR and NLU) on the audio data to determine text (illustrated as 152). Using the text, the server determines the user's intent (i.e., search or browse for content) and a topic (e.g., newly released movies, etc.) (illustrated as 154). The server 120 may determine the user's intent is to search when the text contains structured, specific information regarding a desired result. A search may refer to a user indication to obtain content on a particular item, such as a movie, song, television show, etc. In one example, a search may be triggered by a user saying "Show me the Lion King." In another example, the server 120 may determine the user's intent is to browse when the text is unstructured, and contains a less specific description of the desired result (i.e., is not specific to a particular item). A browse may refer to a user indication to obtain content on a range of items or a broad category of items, such as horror movies, comedy sitcoms, etc. For example, a browse may be triggered by a user saying "Show me comedies," or "Show me what's on." A "search" may refer to an attempt by the user to locate a particular item or content. In contrast, a "browse" may refer to an attempt by the user to locate multiple related items.

In addition, the server 120 determines an endpoint device 140 to display results of the search or browse (illustrated as 156). The endpoint device 140 may be determined using a user profile associated with the speech-controlled device 110. In an example, the speech-controlled device 100 may include a display 105, thereby enabling the device 110 to be the endpoint device. In another example, the endpoint device 140 may be a smart television or other display device located separately from the device 110. The endpoint device 140 may be determined based on output capabilities and/or user preferences specific to the endpoint device 140. For example, each endpoint device 140 may be capable of operating a template for outputting search results, a template for outputting browse results, or a template for outputting both search and browse results. As such, an endpoint device 140 may be determined based on the endpoint device 140 having a template applicable for outputting results specific to the topic of the search or browse. Thus the system may determine what results were called for in the user's query and may select the endpoint device based on the content of the results.

The server 120 also determines an appropriate content source 130 based on the intent and topic of the text (illustrated as 158). The content source may be an internal content source (i.e., a content source maintained and operated by an entity that controls the server 120). Alternatively, the content source may be an external content source (i.e., a content source maintained and operated by an entity separate from the entity that controls the server 120). For example, a user may request the system browse content for a particular music service provider or video service provider. The system may interact with that provider to obtain the data needed for the browse and may return that data to the endpoint device.

The server 120 may then create a data request (illustrated as 160) and send the data request to the content source 130 (illustrated as 162). The data request may include information specific to the topic of the search or browse. Moreover, to increase the applicability of the results of the search or browse to the user, contextual user information may also be included within the data request. Illustrative contextual information includes the age of the user (i.e., child v. adult), what room of a building or house the device 110 is in, the time of day it is, or the like. By including contextual information within the data request, the results of the search or browse may be more relevant to the user's intent. The information in the data request may be structured specific to requirements of the content source 130. In an example, the information of the data request may be structured into slots (e.g., a video search may include an era slot, a genre slot, etc.). Moreover, the information in the data request may be tailored to the output requirements of the endpoint device 140. For example, if an output template of the endpoint device includes thumbnails and/or summaries, data regarding thumbnail and/or summary information may be included within the data request. And ultimately passed to the endpoint device for output by the endpoint device to the user.

The content source 130 identifies/determines content (i.e., results) relevant to the data request and sends the results to the server 120 (illustrated as 164). The server 120 sends the results and metadata that dictates how the results are to be displayed to the endpoint device 140 (illustrated as 166). The server 120 may generate the metadata based on the results to be displayed and/or output template requirements of the endpoint device 140. Upon receiving the results and metadata, the endpoint device 140 outputs the results according to instructions contained within the metadata.

In an example, the server 120 may create an audio announcement or obtain an audio recording corresponding to an indication of which endpoint device 140 will/is output (ting) the results. The server 120 may perform text-to-speech (TTS) processing on stored text to create computer generated speech corresponding to the selected endpoint device 140. Alternatively, the server(s) 120 may access a table of user pre-recorded audio or computer pre-generated speech to obtain audio corresponding to the selected endpoint device 140. The audio created or obtained by the server 120 may be sent to the device 110 where it is output to the user 10 via one or more speakers 101 of the device 110 or one or more microphone arrays associated with the device 110.

Figure 2:
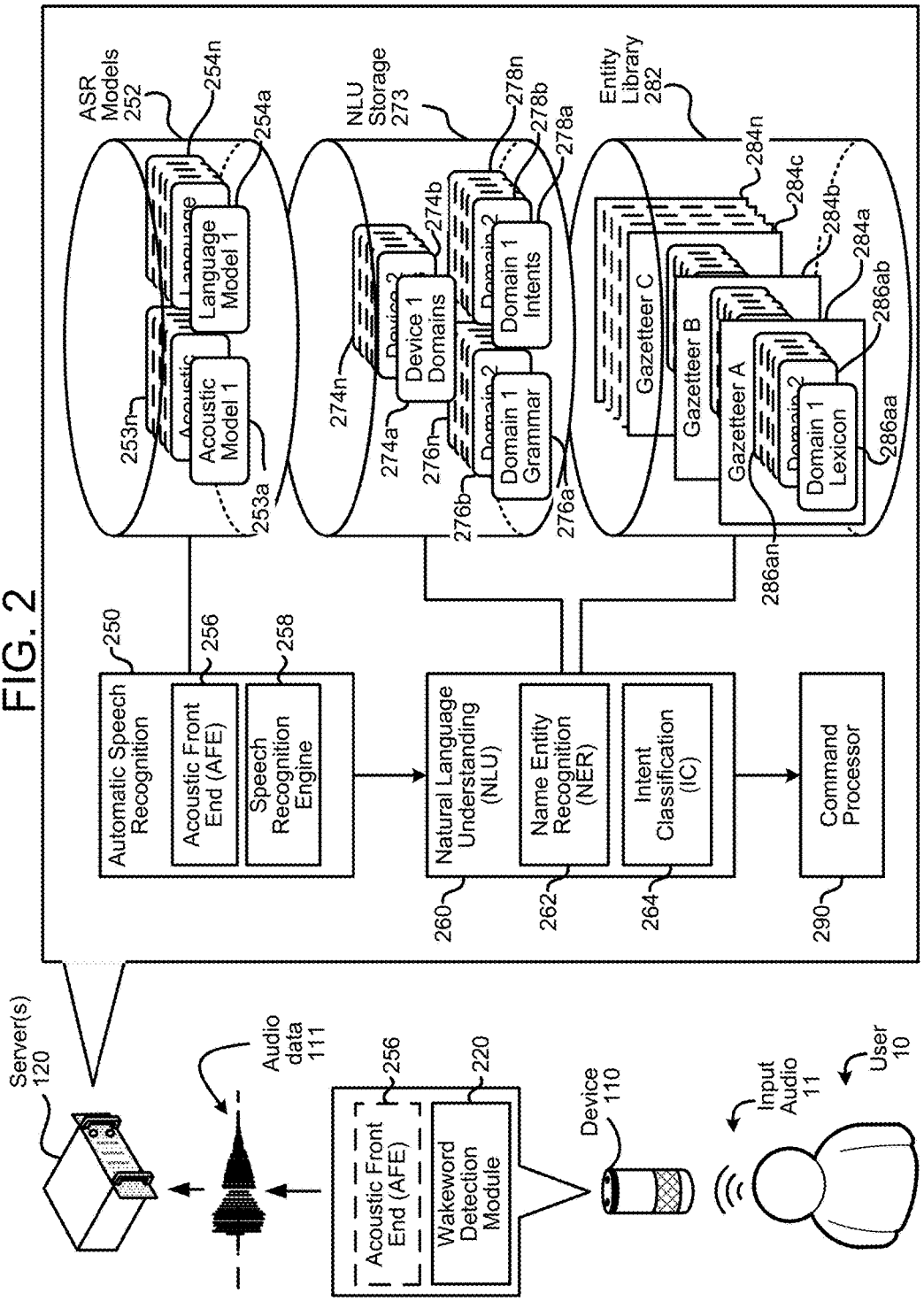
FIG. 2 is a conceptual diagram of a speech processing system according to embodiments of the present disclosure.

Further details of training and operating query parsing models are discussed below, following a discussion of the overall speech processing system of FIG. 2. FIG. 2 is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2 may occur directly or across a network 199. An audio capture component, such as a microphone of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device 110, for example a microphone (not pictured) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending. Further, a local device 110 may "wake" upon detection of speech/spoken audio above a threshold, as described herein. Upon receipt by the server(s) 120, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252c. For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a speech recognition engine 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a specific application like a search engine, etc.).

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, and knowledge base 272. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

the NLU process may be configured to parse, tag, and annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU knowledge base 272 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's knowledge base 272). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextional operational rules to fill slots. For example, if a user had previously requested to pause a particular song and thereafter requested that the speech-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

Figure 3:
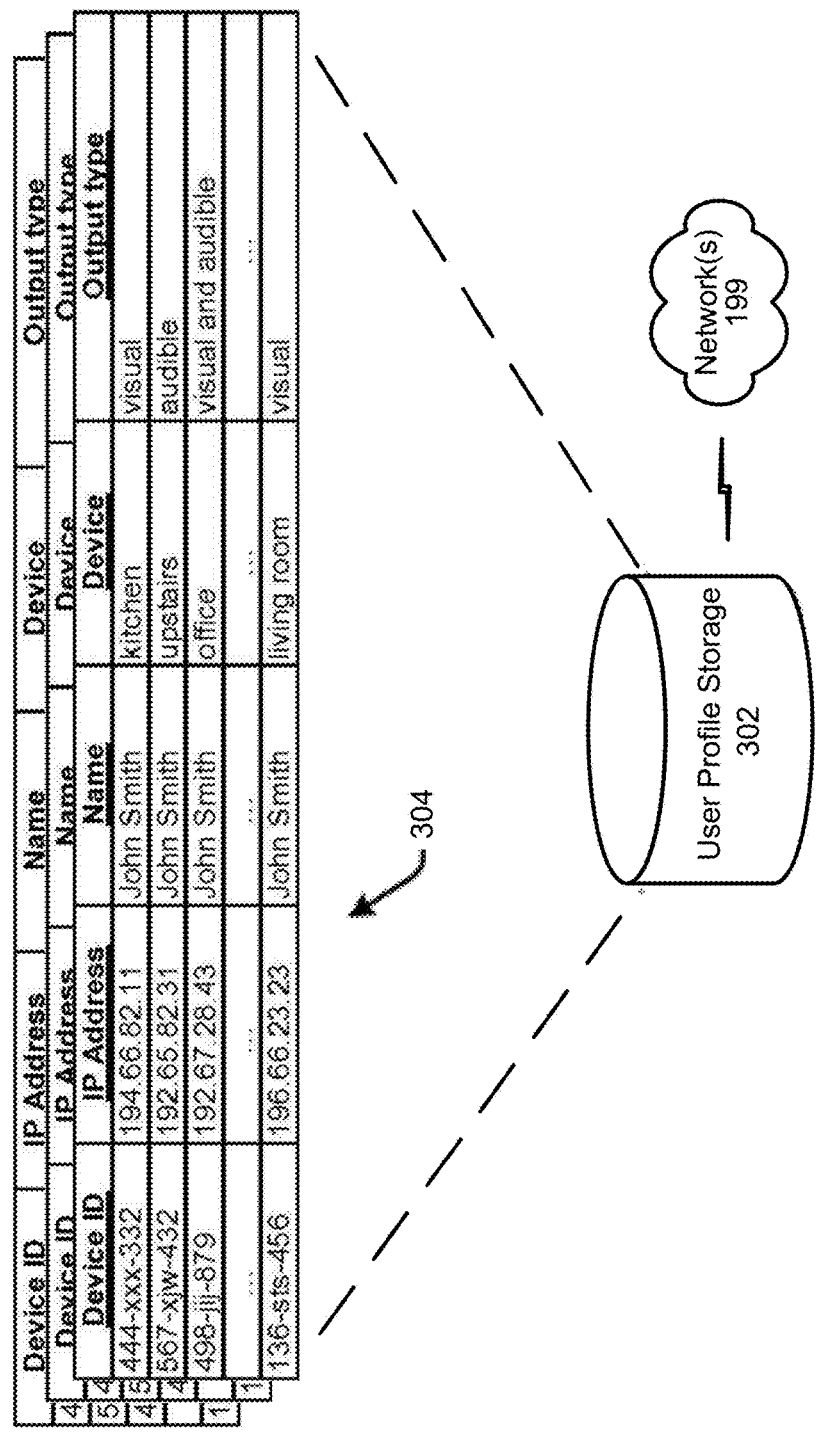
FIG. 3 illustrates data stored and associated with user profiles according to embodiments of the present disclosure.

The server 120 may also include data regarding user accounts, shown by the user profile storage 302 illustrated in FIG. 3. The user profile storage may be located proximate to the server 120, or may otherwise be in communication with various components, for example over the network 199. The user profile storage 302 may include a variety of information related to individual users, accounts, etc. that interact with the system 100. For illustration, as shown in FIG. 3, the user profile storage 302 may include data regarding the devices associated with particular individual user accounts 304. In an example, the user profile storage 302 is a cloud-based storage. Such data may include device identifier (ID) and internet protocol (IP) address information for different devices as well as names by which the devices may be referred to by a user. Further qualifiers describing the devices may also be listed along with a description of the type of object of the device. The user profile storage may additionally include output capabilities and template information of each device, etc.

Figure 4A:
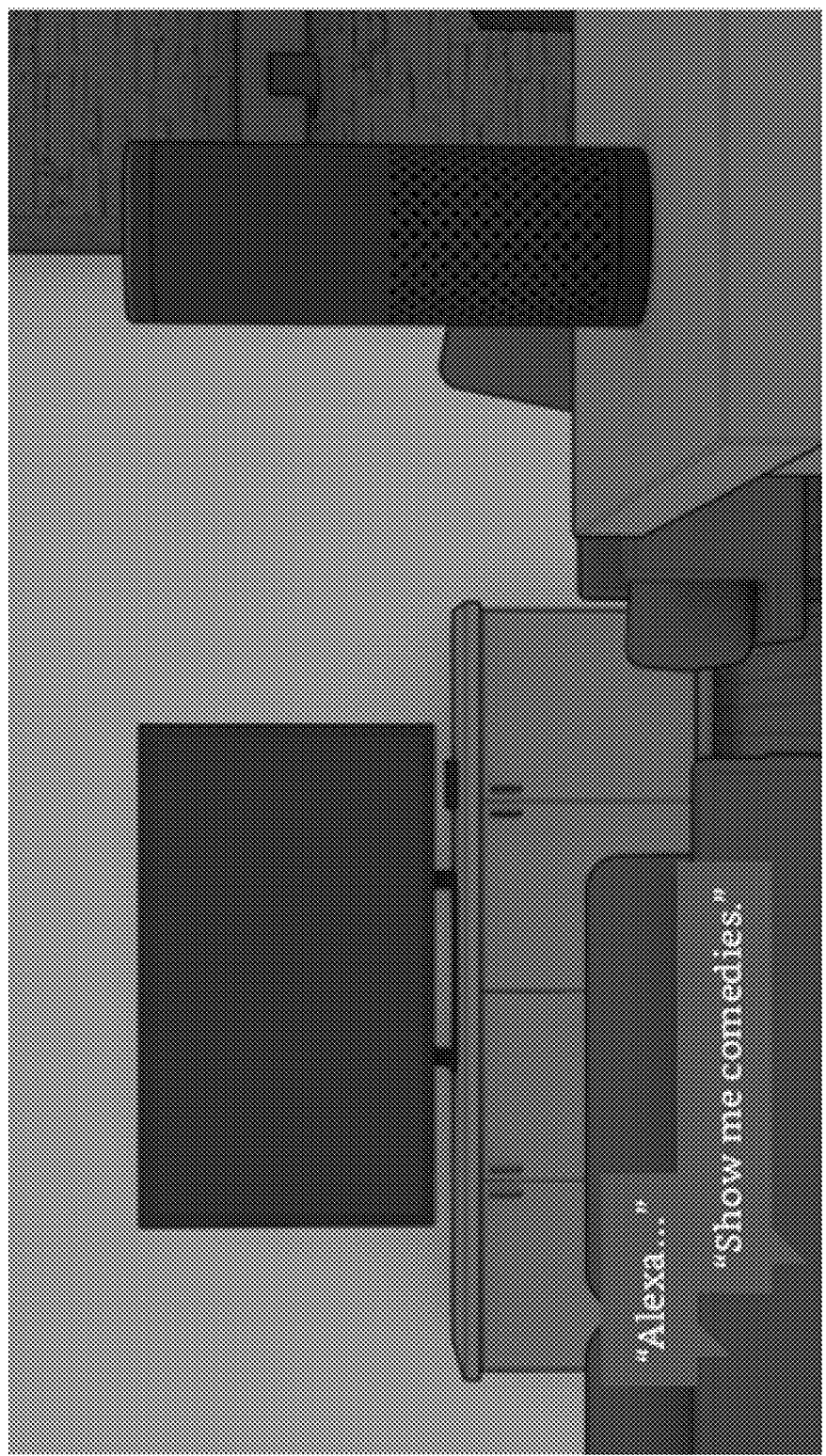
FIGS. 4A through 4C illustrate an example of browsing for content using a speech-controlled device and displaying the results using an endpoint device according to embodiments of the present disclosure.
Figure 4B:
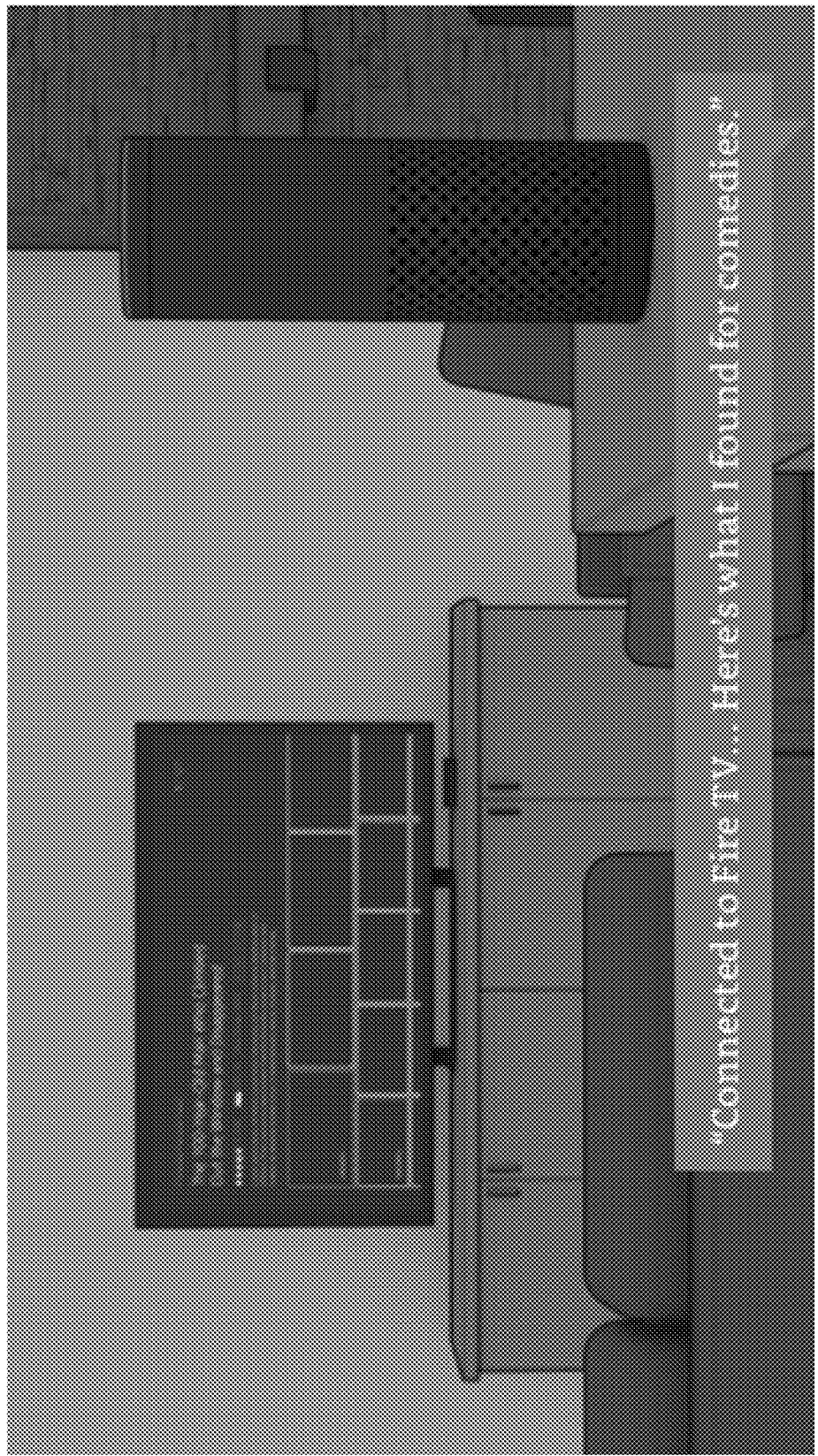
Figure 4C:
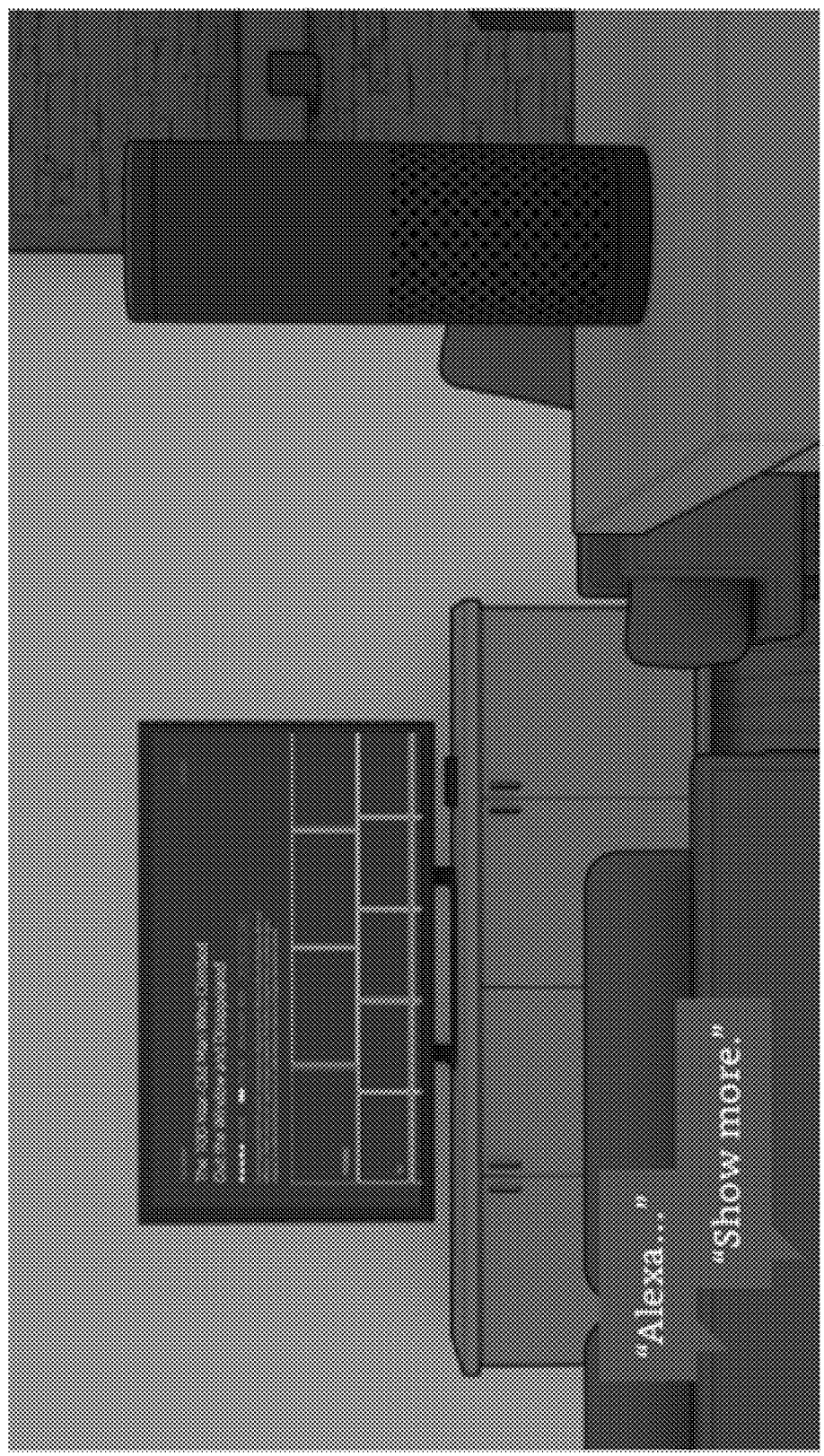

FIGS. 4A through 4C illustrate an example of browsing for content using a speech-controlled device and displaying the results using an endpoint device. As illustrated in FIG. 4A, a user may speak a wakeword and a command (e.g., "Alexa, show me comedies," where "Alexa" is the wakeword portion and "show me comedies" is the command portion). The speech-controlled device 110 then converts the command audio into audio data and sends the audio data to the server 120, which performs the backend speech processing as described herein. The resulting content of the browse is displayed on a display of an endpoint device 140, for example a television as illustrated in FIG. 4B. The speech-controlled device 110 may notify the user (audibly and/or visually) of the endpoint device 140 and the results of the browse. For example, the speech-controlled device 110 may output audio corresponding to "Connected to Fire TV. Here's what I found for comedies."

When results of the browse are displayed on the endpoint device 140, the user may desire additional results be displayed. As illustrated in FIG. 4C, the user may speak a device wakeword and a command to show additional content (e.g., "Alexa, show more"). The device 110 may send audio data corresponding to the captured audible command to the server 120, which performs speech processing on the audio data to identify the text, determines that the user is already browsing content previously provided by the system, then updates the results to execute the command (i.e., show the "more" results) and causes the endpoint device 140 (i.e., the television or a computing device/server that controls the television) to display additional results. In an example, the server 120 may request and receive the additional results from the content source 130. Those additional results may have already been received in response to the initial data request (and saved for the browsing operation) or the server 120 may request and receive those additional results as a result of the user's request for more. In the first instance, the additional results may simply be pushed to the television (or corresponding computing device/server) by the server 120. In the second instance, the server 120 may not receive the additional results from the content source 130 in response to the initial data request. Thus, in response to receiving the second command to "show more," the server 120 may send a second data request to the content source 130, which provides the server 120 with the additional results requested. The server 120 may then cause the television to display the additional results.

In an unillustrated example, a user may state "show me comedies." In response the system may identify the user is in a room with a television and, therefrom, determine the user is talking about television comedy shows or movies (as compared to comedy albums or radio shows). The system may also determine a service(s) (e.g., a television streaming server, a movie streaming service, or a television and movie streaming server) that has comedies and that the user (or television) is capable of accessing (for example, services to which the user subscribes as indicated in the user profile). The system selects comedies from the service(s) matching the user's preferences, viewing history, etc. as associated with the user's profile. The system may also determine an order in which to display the selected comedies, and sends the selected comedies and the order of display to the television.

In another unillustrated example, a user may state "show me the Lion King." In response the system may identify the user is in a room with a television and, therefrom, determine the user is talking about television show or movie title "The Lion King." The system may also determine a service(s) (e.g., a television streaming server, a movie streaming service, or a television and movie streaming server) that has "The Lion King." The system selects multimedia data and optionally summary data from the service(s) matching "The Lion King." The system then sends the summary data, icons, etc. to the television.

FIGS. 5A and 5B illustrate speech-controlled searching and browsing according to embodiments of the present disclosure. A speech-controlled device 110 receives spoken audio from a user (illustrated as 502). The spoken audio may include a wakeword and a command (i.e., topic information from which the server 120 may determine whether the user intends to search or browse for content). The device 110 converts at least the command portion of the received audio into audio data, which the device 110 sends to the server 120 (illustrated as 504). The server 120 performs ASR on the audio data to determine text (illustrated as 506) and performs NLU on the text (illustrated as 508). Using the NLU results, the server 120 determines an intent of the user (illustrated as 510). That is, the server 120 uses the NLU results to determine whether the user wants to browse for content or search for content. For example, the server 120 may determine the user intends to browse for content when the text contains unstructured, general information (e.g., "show me comedies"). Alternatively, the server 120 may determine the user intends to search for content when the text contains structured, specific information. An example of text that may trigger a search includes "find action movies from the 1980s starring Arnold Schwarzenegger." The server 120 also determines the topic or subject (e.g., videos, images, songs, etc.) of the browse or search requested (illustrated as 511). The topic or subject may be determined using the ASR resulting text or the NLU results.

The server 120 determines an endpoint device configured to and capable of output(ting) the content corresponding to the subject or topic (illustrated as 518). Determination of the endpoint device may involve the use of a user profile. For example, if it is known that the speech-controlled device 110 that captured the audio is in a living room of a house, a user profile associated with the voice controlled device 110 may be accessed to determine an endpoint device within the living room of the house. In another example, an endpoint device including a template for outputting content of the subject or topic may be selected. Templates of endpoint devices may be accessed using a user profile. Each endpoint device may include output configurations such as whether thumbnails and/or summaries will be displayed.

According to the example above where the user stated "show me comedies," the system may have determined that the user wanted comedy albums based on the user recently listening to a lot of comedic audio. In this instance, instead of determining the television as the endpoint device, the system may determine the best output for the browse results is the speech controlled device 110. Additionally, instead of causing the endpoint device to visually output the results (as is the case in the example where the television output the results), the system may cause the speech controlled device to output audible results (e.g., "would you like to listen to the next Chris Rock album?"). If the user responds affirmatively (e.g., the user says "yes"), the system could send the audio for the next Chris Rock album to the speech controlled device 110.

The server 120 also determines a content source having information relevant to the topic or subject (illustrated as 512 in FIG. 5B). The content source may be an internal content source (i.e., a content source maintained and operated by an entity that controls the server 120). Alternatively, the content source may be an external content source (i.e., a content source maintained and operated by an entity separate from the entity that controls the server 120). Selection of the content source may involve the server 120 accessing a user profile associated with the speech-controlled device 110 to determine content sources to which a user of the speech-controlled device 110 has access. In addition, multiple content sources may be accessed to obtain results for the search or browse. For example, if the user says "show me comedies," a content source controlled by the server 120 may be accessed, a second content source not controlled by the server 120 may be accessed, and/or a third content source including stored data of a digital video recorder associated with the user profile may be accessed.

The server 120 creates a data request and sends the data request to the applicable content source 130 (illustrated as 514). The data request includes information specific to the topic or subject of the search or browse. Moreover, to increase the applicability of the search or browse results to the user, contextual information may also be included within the data request. Illustrative contextual information includes the age of the user or others in the content consumption location (i.e., child v. adult), what room of a building or house the device 110 is in, and/or the time of day it is. By including contextual information within the data request, the search or browse results may be more relevant to the user's intent. The information in the data request may be structured specific to requirements of the content source 130. In an example, the information of the data request may be structured into slots (e.g., a video search may include an era slot, a genre slot, etc.). Moreover, the information in the data request may be tailored to the output requirements of the endpoint device 140. For example, if an output template of the endpoint device includes thumbnails and/or summaries, data regarding thumbnail and/or summary information may be included within the data request.

The content source 130 uses information of the data request to locate data (i.e., results), and sends all or a portion of the identified data to the server 120 (illustrated as 516). The server 120 creates metadata that may include instructions as to how the results should be output/displayed (illustrated as 520). The metadata may be specific to one or more output templates of the determined endpoint device 140, and may include instructions pertaining to font size, font type, content layout, etc. The server 120 sends all or some of the results data received from the content source 130, along with the created metadata, to the endpoint device 140 (illustrated as 522). The endpoint device 140, upon receiving the results data and metadata, outputs the results according to the instructions within the metadata (illustrated as 524).

Figure 6A:
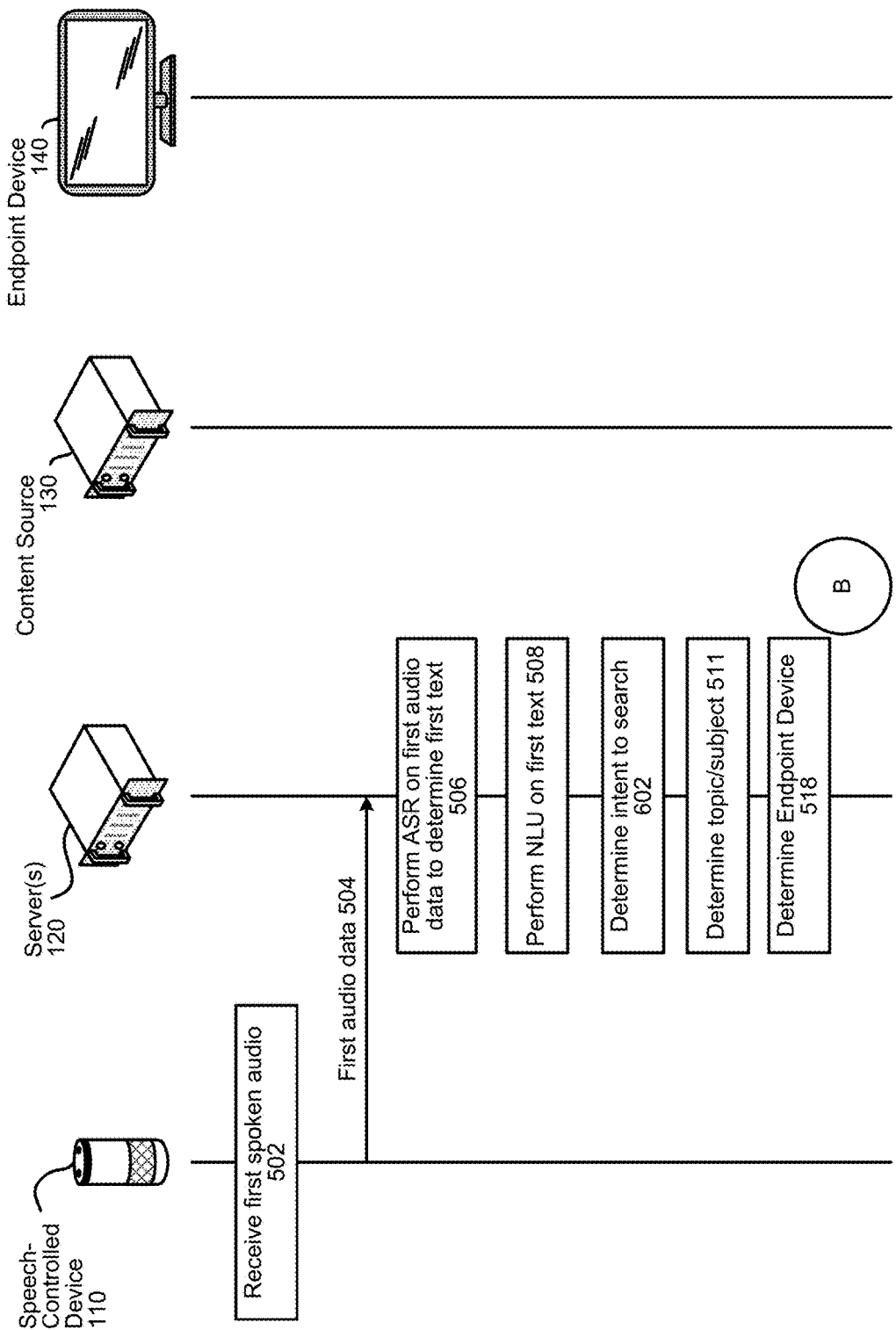

FIGS. 6A through 6C illustrate speech-controlled searching according to embodiments of the present disclosure. A speech-controlled device 110 receives spoken audio from a user (illustrated as 502). The spoken audio may include a wakeword and a command (i.e., topic information from which the server 120 may determine whether the user intends to search or browse for content). The device 110 converts at least the command portion of the received audio into audio data, which the device 110 sends to the server 120 (illustrated as 504). The server 120 performs ASR on the audio data to determine text (illustrated as 506) and performs NLU on the text (illustrated as 508). Using the NLU results, the server 120 determines the user intends to search for content (illustrated as 602). Determining the user intends to search may include the server 120 determining the text is configured in a slot-based manner. Commands executable by the system may use slots, where each slot represents a piece of data needed to execute the particular command. For example, the text may include "find action movies from the 80s starring Arnold Schwarzenegger." According to the example, the portion "action" may be attributed to a genre slot, "80s" may be attributed to an era slot, and "Arnold Schwarzenegger" may be attributed to an actor slot. The server 120 also determines the topic or subject (e.g., videos, images, songs, etc.) of the search requested (illustrated as 511). The topic or subject may be determined using the ASR resulting text or the NLU results. To determine the topic/subject, the text may be broken out into structured data or slots. Accordingly, using the slotted, structured data, the server 120 may determine the text "find action movies from the 80s starring Arnold Schwarzenegger" corresponds to movies.

The server 120 determines an endpoint device configured to and capable of output(ting) the results corresponding to the subject or topic (illustrated as 518). Determination of the endpoint device may involve the use of a user profile. For example, if it is known that the speech-controlled device 110 that captured the audio is in a living room of a house, a user profile associated with the voice controlled device 110 may be accessed to determine an endpoint device within the living room of the house. In another example, an endpoint device including a template for outputting results of the subject or topic may be selected. Templates of endpoint devices may be accessed using a user profile. Each endpoint device may include output configurations such as whether thumbnails and/or summaries will be displayed.

Once the endpoint device is determined, the server 120 determines a content source having information relevant to the topic or subject (illustrated as 512 in FIG. 6B). The content source may be an internal content source (i.e., a content source maintained and operated by an entity that controls the server 120). Alternatively, the content source may be an external content source (i.e., a content source maintained and operated by an entity separate from the entity that controls the server 120). Selection of the content source may involve the server 120 accessing a user profile associated with the speech-controlled device 110 to determine content sources to which a user of the speech-controlled device 110 has access. According to the present example, a content source for "find action movies from the 80s starring Arnold Schwarzenegger" may be a source dedicated to movies.

Once the content source is determined, the server 120 may locate a data structure specific to requirements of the content source (illustrated as 604). For example, the server 120 may access a lookup table that includes data structure requirements associated with specific content sources. One music content source may require artist data be presented before genre data, another music content source may require song title data be presented before artist data, etc. For illustration, Amazon Prime Music may have a different data structure requirement than other on-demand music servics for purposes of performing a search. The server 120 may also apply information from the text to the content source's specific data structure (illustrated as 606).

The server 120 then creates a data request including information structured specific to the content source's requirements (illustrated as 608), and sends the data request to the identified content source 130 (illustrated as 514). The data request includes information specific to the topic or subject of the search. Moreover, to increase the applicability of the search results to the user, contextual information may also be included within the data request. Illustrative contextual information includes the age of the user (i.e., child v. adult), what room of a building or house the device 110 is in, and/or the time of day it is. By including contextual information within the data request, the search results may be more relevant to the user's intent. In an example, the information of the data request may be structured into slots (e.g., a video search may include an era slot, a genre slot, etc.) dictated by content source requirements. Moreover, the information in the data request may be tailored to the output requirements of the endpoint device 140. For example, if an output template of the endpoint device includes thumbnails and/or summaries, data regarding thumbnail and/or summary information may be included within the data request.

The content source 130 uses information of the data request to locate data (i.e., results), and sends all or a portion of the identified data to the server 120 (illustrated as 516 in FIG. 6C). The server 120 creates metadata that includes instructions as to how the results should be output/displayed (illustrated as 520). The metadata may be specific to one or more output templates of the determined endpoint device 140, and may include instructions pertaining to font size, font type, content layout, etc. The server 120 sends all or some of the results data received from the content source 130, along with the created metadata, to the endpoint device 140 (illustrated as 522). The endpoint device 140, upon receiving the results data and metadata, outputs the results according to the instructions within the metadata (illustrated as 524).

FIGS. 7A and 7B illustrate speech-controlled supplemental searching or browsing according to embodiments of the present disclosure. A speech-controlled device 110 receives spoken audio from a user (illustrated as 702). The spoken audio may include a wakeword and a command (i.e., topic information from which the server 120 may determine whether the user intends to search or browse for supplemental content). The device 110 converts at least the command portion of the received audio into audio data, which the device 110 sends to the server 120 (illustrated as 704). The server 120 performs ASR on the audio data to determine text (illustrated as 706) and performs NLU on the text (illustrated as 708). Using the NLU results, the server 120 determines the user is requesting additional, supplemental results of a previously performed search or browse (illustrated as 710). The server 120 then determines the requested additional, supplemental results were not received when the original results of the search or browse were received from the content source 130 (illustrated as 712).

The server 120 determines an endpoint device configured to and capable of output(ting) the results corresponding to the subject or topic (illustrated as 518). Determination of the endpoint device may involve the use of a user profile. For example, if it is known that the speech-controlled device 110 that captured the audio is in a living room of a house, a user profile associated with the voice controlled device 110 may be accessed to determine an endpoint device within the living room of the house. In another example, an endpoint device including a template for outputting results of the subject or topic may be selected. Templates of endpoint devices may be accessed using a user profile. Each endpoint device may include output configurations such as whether thumbnails and/or summaries will be displayed. The determined endpoint device may be the same or a different endpoint device than the endpoint device that output the original search or browse results.

The server 120 creates a supplemental data request and sends it to the content source 130 (illustrated as 714 in FIG. 7B). The supplemental data request includes information requesting supplemental, additional results. For example, the original data request may correspond to "show me comedies" and the supplemental data request may correspond to "show me more," "show me more comedies," or "also show me dramas." The content source 130 that receives the supplemental data request may be the same or a different content source that received the original browse or search data request. The supplemental data request may include information specific to the topic or subject of the original search or browse, and optionally may include information indicating the results previously received by the server 120. This enables the content source 130 to selectively send supplemental, additional results to the server 120 so the server 120 does not receive results already displayed. Moreover, to increase the applicability of the supplemental results to the user, contextual information may also be included within the supplemental data request. Illustrative contextual information includes the age of the user (i.e., child v. adult), what room of a building or house the device 110 is in, and/or the time of day it is. By including contextual information within the supplemental data request, the supplemental search or browse results may be more relevant to the user's intent. In an example, the information of the supplemental data request may be structured according to content source requirements. Moreover, the information in the supplemental data request may be tailored to output requirements of the endpoint device 140. The content source 130 identifies content specific to the original search or browse request that was not already sent to the server 120, and sends the supplemental results to the server 120 (illustrated as 716).

The server 120 creates metadata that includes instructions as to how the supplemental results should be output/displayed (illustrated as 520). The metadata may be specific to one or more output templates of the determined endpoint device 140, and may include instructions pertaining to font size, font type, content layout, etc. The server 120 sends all or some of the supplemental results data received from the content source 130, along with the created metadata, to the endpoint device 140 (illustrated as 718). The endpoint device 140, upon receiving the supplemental results data and metadata, outputs the supplemental results according to the instructions within the metadata (illustrated as 720).

FIGS. 8A and 8B illustrate speech-controlled supplemental searching or browsing according to embodiments of the present disclosure. A speech-controlled device 110 receives spoken audio from a user (illustrated as 702). The spoken audio may include a wakeword and a command (i.e., topic information from which the server 120 may determine whether the user intends to search or browse for supplemental content). The device 110 converts at least the command portion of the received audio into audio data, which the device 110 sends to the server 120 (illustrated as 704). The server 120 performs ASR on the audio data to determine text (illustrated as 706) and performs NLU on the text (illustrated as 708). Using the NLU results, the server 120 determines the user is requesting additional, supplemental results of a previously performed search or browse (illustrated as 710). The server 120 then determines the requested additional, supplemental results were previously received when the original results for the search or browse were received from the content source 130 (illustrated as 802).

The server 120 determines an endpoint device configured to and capable of output(ting) the results corresponding to the subject or topic (illustrated as 518 in FIG. 8B). Determination of the endpoint device may involve the use of a user profile. For example, if it is known that the speech-controlled device 110 that captured the audio is in a living room of a house, a user profile associated with the voice controlled device 110 may be accessed to determine an endpoint device within the living room of the house. In another example, an endpoint device including a template for outputting results of the subject or topic may be selected. Templates of endpoint devices may be accessed using a user profile. Each endpoint device may include output configurations such as whether thumbnails and/or summaries will be displayed. The determined endpoint device may be the same or a different endpoint device than the endpoint device that output the original search or browse results.

The server 120 creates metadata that includes instructions as to how the supplemental results should be output/displayed (illustrated as 520). The metadata may be specific to one or more output templates of the determined endpoint device 140, and may include instructions pertaining to font size, font type, content layout, etc. The server 120 sends all or some of the supplemental results data previously received from the content source 130, along with the created metadata, to the endpoint device 140 (illustrated as 718). The endpoint device 140, upon receiving the supplemental results data and metadata, outputs the supplemental results according to the instructions within the metadata (illustrated as 720).

FIGS. 9A and 9B illustrate speech-controlled refinement of search or browse results according to embodiments of the present disclosure. A speech-controlled device 110 receives spoken audio from a user (illustrated as 702). The spoken audio may include a wakeword and a command (i.e., topic information from which the server 120 may determine whether the user intends to search or browse for supplemental content). The device 110 converts at least the command portion of the received audio into audio data, which the device 110 sends to the server 120 (illustrated as 704). The server 120 performs ASR on the audio data to determine text (illustrated as 706) and performs NLU on the text (illustrated as 708). Using the NLU results, the server 120 determines the user is requesting previously displayed search or browse results be refined (illustrated as 902). For example, the original search or browse request may correspond to "show me comedies" and the refinement request may correspond to "show me comedies from the 1980s." The server 120 then determines the last performed search or browse and its results (illustrated as 904).

The server 120 determines an endpoint device configured to and capable of output(ting) the refined results (illustrated as 518 in FIG. 9B). Determination of the endpoint device may involve the use of a user profile. Each endpoint device may include output configurations such as whether thumbnails and/or summaries will be displayed. The determined endpoint device may be the same or a different endpoint device than the endpoint device that output the original search or browse results. For example, if the original search or browse results were displayed by an endpoint device in the living room of a house and the refinement request was received by a speech-controlled device in a bedroom of the house, a different endpoint device proximate the speech-controlled device (e.g., an endpoint device in the bedroom) may be chosen.

The server 120 creates metadata that includes instructions as to how the refined results should be output/displayed (illustrated as 520). The metadata may be specific to one or more output templates of the determined endpoint device 140, and may include instructions pertaining to font size, font type, content layout, etc. The server 120 sends all or some of the refined results, along with the created metadata, to the endpoint device 140 (illustrated as 906). The endpoint device 140, upon receiving the refined results data and metadata, outputs the refined results according to the instructions within the metadata (illustrated as 720).

The endpoint device that displays the results of the original search or browse may be different from the endpoint device that displays the supplemental or refined results, as described with respect to FIGS. 8 and 9. For example, the first results may be sent to television and the supplemental or refined results may be sent to the speech controlled device, a smart phone, a tablet, or the like. The user may control where results are sent for output. For example, the user may say "send the 80s comedies to my phone," which causes the system to send the results to a phone associated with a profile of the user.

Figure 10:
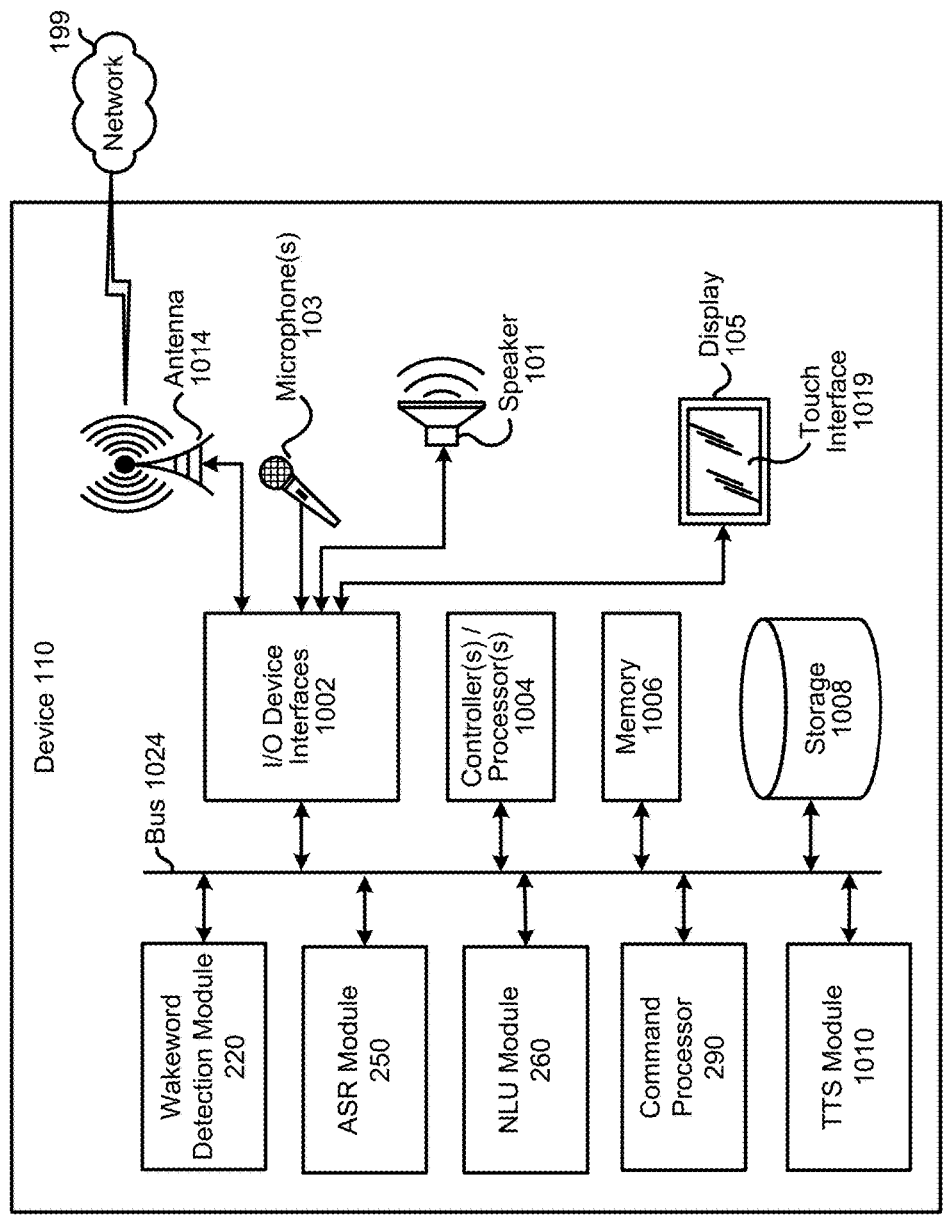
FIG. 10 is a block diagram conceptually illustrating example components of a device according to embodiments of the present disclosure.
Figure 11:
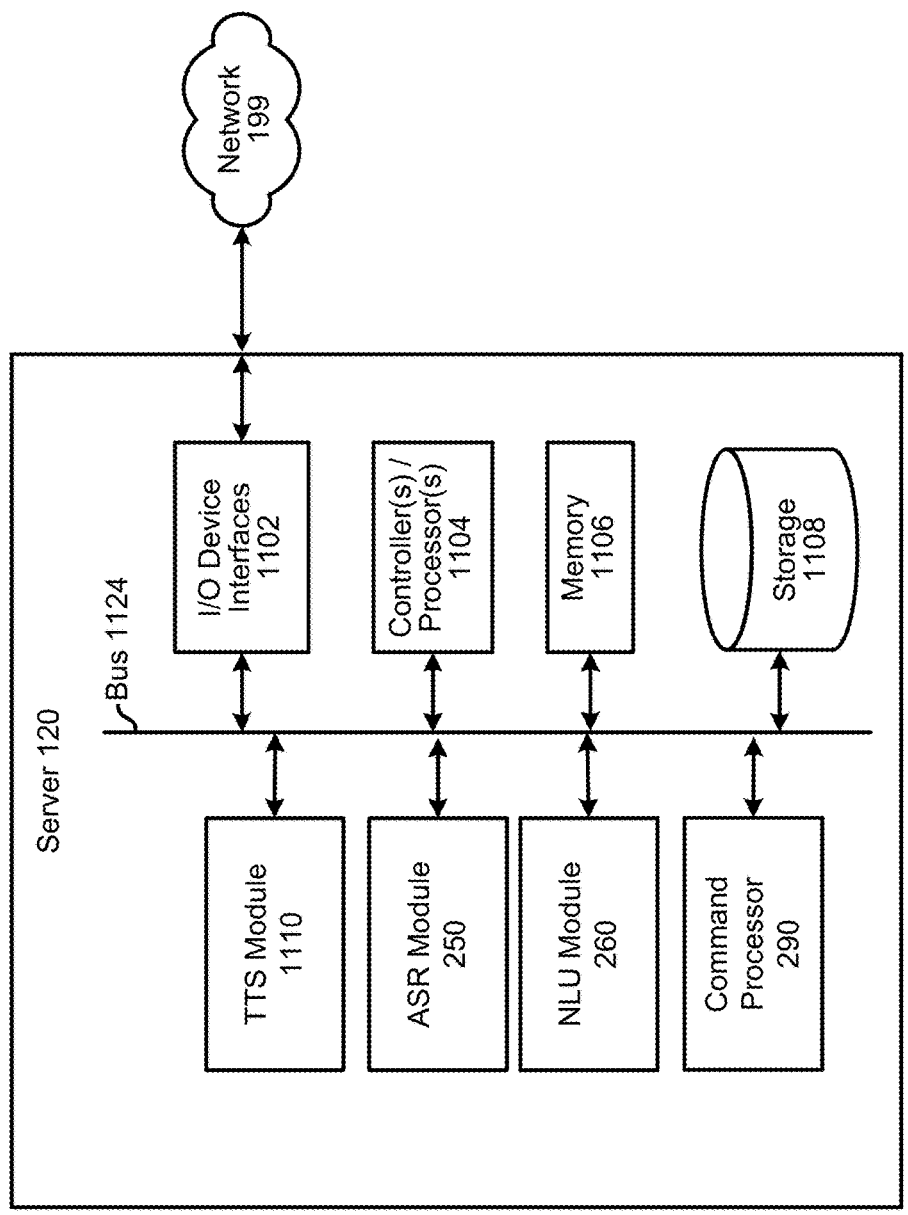
FIG. 11 is a block diagram conceptually illustrating example components of a server according to embodiments of the present disclosure.

FIG. 10 is a block diagram conceptually illustrating a local device 110 that may be used with the described system. FIG. 11 is a block diagram conceptually illustrating example components of a remote device, such as a remote server 120 that may assist with ASR, NLU processing, or command processing. Multiple such servers 120 may be included in the system, such as one server(s) 120 for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1004/1104), that may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive (MRAM) and/or other types of memory. Each device may also include a data storage component (1008/1108), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1002/1102).

Computer instructions for operating each device (110/120) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120) includes input/output device interfaces (1002/1102). A variety of components may be connected through the input/output device interfaces (1002/1102), as will be discussed further below. Additionally, each device (110/120) may include an address/data bus (1024/1124) for conveying data among components of the respective device. Each component within a device (110/120) may also be directly connected to other components in addition to (or instead of) being connected to other components across the bus (1024/1124).

Referring to the device 110 of FIG. 10, the device 110 may include a display 105, which may comprise a touch interface 1019. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 1002 that connect to a variety of components such as an audio output component such as a speaker 101, a wired headset or a wireless headset (not illustrated) or other component capable of outputting audio. The device 110 may also include an audio capture component. The audio capture component may be, for example, a microphone 103 or array of microphones, a wired headset or a wireless headset (not illustrated), etc. The microphone 103 may be configured to capture audio. If an array of microphones is included, approximate distance to a sound's point of origin may be determined by acoustic localization based on time and amplitude differences between sounds captured by different microphones of the array. The device 110 (using microphone 103, wakeword detection module 220, ASR module 250, etc.) may be configured to determine audio data corresponding to detected audio data. The device 110 (using input/output device interfaces 1002, antenna 1014, etc.) may also be configured to transmit the audio data to server 120 for further processing or to process the data using internal components such as a wakeword detection module 220.

For example, via the antenna(s) 1014, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the name entity recognition module 262, the intent classification module 264 and/or other components. The NLU module 260 may also include a stored knowledge base and/or entity library, or those storages may be separately located.

The device 110 and/or server 120 may also include a command processor 290 that is configured to execute commands/functions associated with a spoken command as described above.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 1008 may store data relating to keywords and functions to enable the wakeword detection module 220 to perform the algorithms and methods described above. The locally stored speech models may be pre-configured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 1008 and compare the captured audio to the stored models and audio sequences using audio comparison, pattern recognition, keyword spotting, audio signature, and/or other audio processing techniques.

To create output speech, the device 110 and/or server 120 may be configured with a text-to-speech ("TTS") module (1010/1110) that transforms text data into audio data representing speech. The audio data may then be played back to the user, thus creating the output speech. The TTS module (1010/1110) may include a TTS storage for converting the input text into speech. The TTS module (1010/1110) may include its own controller(s)/processor(s) and memory or may use the controller/processor and memory of the device 110 or server(s) 120 or other device, for example. Similarly, the instructions for operating the TTS module (1010/1110) may be located within the TTS module (1010/1110), within the memory and/or storage of the device 110 or server(s) 120, or within an external device.

Text input into a TTS module (1010/1110) may be processed to perform text normalization, linguistic analysis, and linguistic prosody generation. During text normalization, the TTS module (1010/1110) processes the text input and generates standard text, converting such things as numbers, abbreviations (such as Apt., St., etc.), and symbols ($, %, etc.) into the equivalent of written out words.

During linguistic analysis the TTS module (1010/1110) analyzes the language in the normalized text to generate a sequence of phonetic units corresponding to the input text. This process may be referred to as phonetic transcription. Phonetic units include symbolic representations of sound units to be eventually combined and output by the system 100 as speech. Various sound units may be used for dividing text for purposes of speech synthesis. The TTS module (1010/1110) may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system 100, for example in the TTS storage. The linguistic analysis performed by the TTS module (1010/1110) may also identify different grammatical components such as prefixes, suffixes, phrases, punctuation, syntactic boundaries, or the like. Such grammatical components may be used by the TTS module (1010/1110) to craft a natural sounding audio waveform output. The language dictionary may also include letter-to-sound rules and other tools that may be used to pronounce previously unidentified words or letter combinations that may be encountered by the TTS module (1010/1110). Generally, the more information included in the language dictionary, the higher quality the speech output.

Based on the linguistic analysis, the TTS module (1010/1110) may then perform linguistic prosody generation where the phonetic units are annotated with desired prosodic characteristics, also called acoustic features, which indicate how the desired phonetic units are to be pronounced in the eventual output speech. During this stage the TTS module (1010/1110) may consider and incorporate any prosodic annotations that accompanied the text input. Such acoustic features may include pitch, energy, duration, and the like. Application of acoustic features may be based on prosodic models available to the TTS module (1010/1110). Such prosodic models indicate how specific phonetic units are to be pronounced in certain circumstances. A prosodic model may consider, for example, a phoneme's position in a syllable, a syllable's position in a word, a word's position in a sentence, phrase, or paragraph, neighboring phonetic units, etc. As with the language dictionary, prosodic models with more information may result in higher quality speech output than prosodic models with less information. As can be appreciated, when a larger portion of a textual work is made available to the TTS module (1010/1110), the TTS module (1010/1110) may assign more robust and complex prosodic characteristics that vary across the portion, thus making the portion sound more human, resulting in higher quality audio output.

The TTS module (1010/1110) may generate a symbolic linguistic representation, which may include a sequence of phonetic units annotated with prosodic characteristics. This symbolic linguistic representation may then be converted into an audio waveform of speech for output to an audio output device (such as a microphone) and eventually to a user. The TTS module (1010/1110) may be configured to convert the input text into high-quality natural-sounding speech in an efficient manner. Such high-quality speech may be configured to sound as much like a human speaker as possible, or may be configured to be understandable to a listener without attempts to mimic a specific human voice.

The TTS module (1010/1110) may perform speech synthesis using one or more different methods. In one method of synthesis called unit selection, described further below, the TTS module (1010/1110) matches the symbolic linguistic representation against a database of recorded speech, such as a database of a voice corpus. The TTS module (1010/1110) matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, the TTS module (1010/1110) may match units (for example in a unit database) to the input text to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis, called parametric synthesis, parameters such as frequency, volume, and noise are varied by the TTS module (1010/1110) to create an artificial speech waveform output. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. The TTS module (1010/1110) may include an acoustic model, or other models, which may convert a symbolic linguistic representation into a synthetic acoustic waveform of the text input based on audio signal manipulation. The acoustic model includes rules that may be used to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation.

As noted above, multiple devices may be employed in a single speech processing system. In such a multi-device system, each of the devices may include different components for performing different aspects of the speech processing. The multiple devices may include overlapping components. The components of the device 110 and server 120, as illustrated in FIGS. 10 and 11, are exemplary, and may be located as a stand-alone device or may be included, in whole or in part, as a component of a larger device or system.

Figure 12:
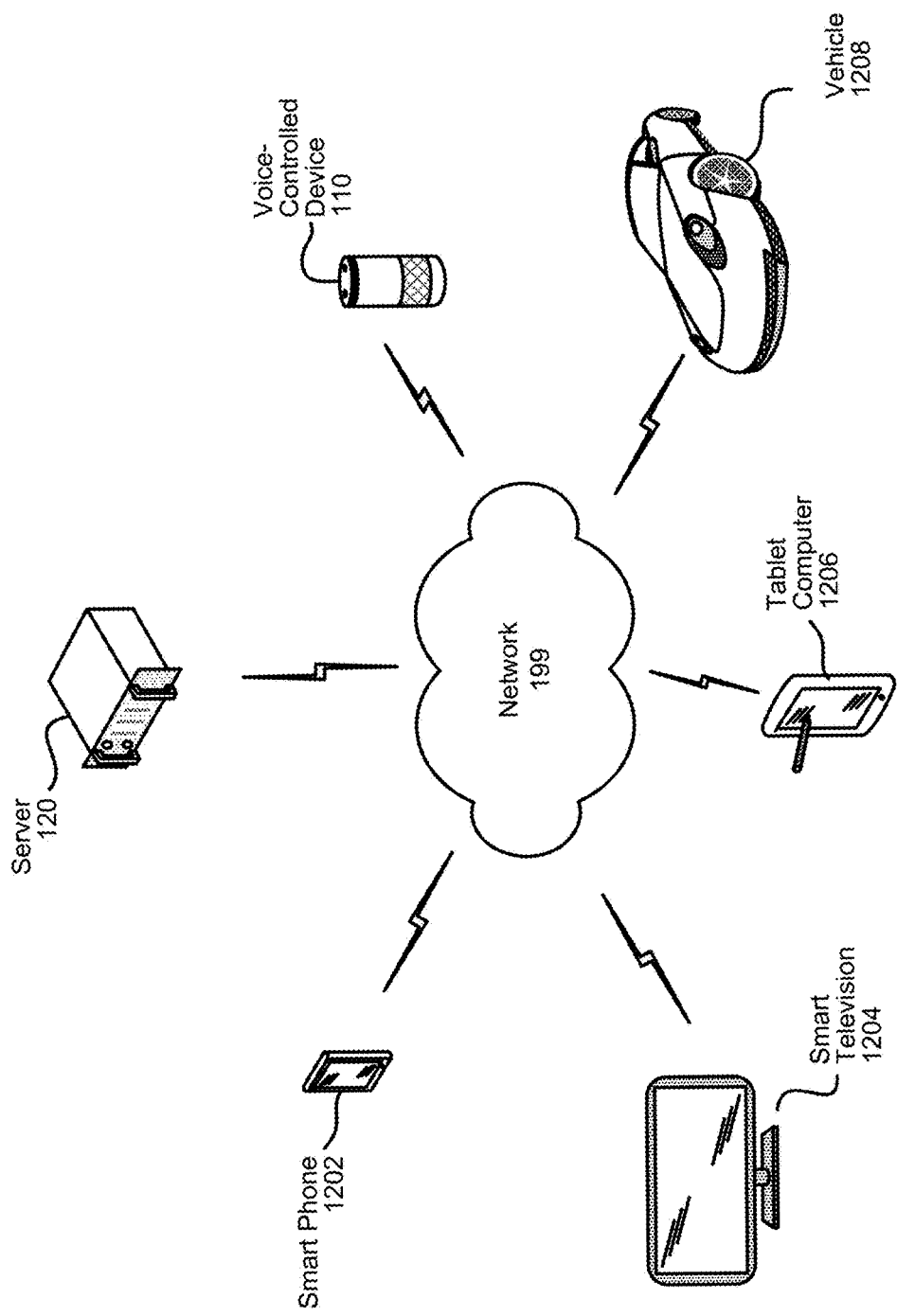
FIG. 12 illustrates an example of a computer network for use with the system.

As illustrated in FIG. 12 multiple devices (110, 120, 1202 to 1208) may contain components of the system 100 and the devices may be connected over a network 199. Network 199 may include a local or private network or may include a wide network such as the internet. Devices may be connected to the network 199 through either wired or wireless connections. For example, a speech-controlled device 110, a smart phone 1202, a smart television 1204, a tablet computer 1206, and/or a vehicle 1208 may be connected to the network 199 through a wireless service provider, over a WiFi or cellular network connection or the like. Other devices are included as network-connected support devices, such as a server 120 or others. The support devices may connect to the network 199 through a wired connection or wireless connection. Networked devices may capture audio using one-or-more built-in or connected microphones or audio capture devices, with processing performed by ASR, NLU, or other components of the same device or another device connected via network 199, such as an ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those having ordinary skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer implemented method comprising:
   receiving, from a speech-controlled device, first input audio data;
   performing speech processing on the first input audio data to create first text data;
   determining the first text data corresponds to a first request to browse first content corresponding to a topic;
   determining that profile data associated with the speech-controlled device is further associated with a plurality of output devices including a first display device;
   selecting, from among the plurality of output devices, the first display device for outputting first results specific to the topic based on the first display device being associated with a first template for outputting results;
   sending, to a content source, a first data request representing the topic;
   receiving first results data from the content source, the first results data representing first content authorized for playback by the first display device;
   generating first metadata including a command representing how the first results data is to be presented based on the first template;
   sending, to the first display device, the first results data; and
   sending, to the first display device, the first metadata.

2. The computer-implemented method of claim 1, further comprising:
   receiving context information from the speech-controlled device, the context information being gathered when first input audio corresponding to the first input audio data was received by the speech-controlled device, the context information identifying at least one of a type of user, location of the speech-controlled device, or time of day; and
   including the context information within the first data request,
   wherein the first results data is further received based on the context information.

3. The computer-implemented method of claim 1, further comprising:
receiving, from the speech-controlled device, second input audio data;
performing speech processing on the second input audio data to create second text data;
determining the second text data corresponds to a second request to refine the first results data presented by the first display device;
determining the second text data includes second content identifying information specific to a portion of the first results data;
generating second results data using the second content identifying information;
generating second metadata including a second command representing how the second results data is to be presented based on the first template;
sending, to the first display device, the second results data;
sending, to the first display device, the second metadata.

4. The computer-implemented method of claim 1, further comprising:
receiving, from the speech-controlled device, second input audio data;
performing speech processing on the second input audio data to create second text data;
determining the second text data corresponds to a second request to supplement the first results data with additional results;
determining the second text data includes second content identifying information;
sending, to the content source, a second data request representing the second content identifying information;
receiving, from the content source, second results data specific to the second content identifying information;
generating second metadata including a second command representing how the second results data is to be presented;
sending, to the first display device, the second results data; and
sending, to the first display device, the second metadata.

5. A system comprising:
at least one processor; and
at least one memory including instructions that, when executed by the at least one processor, cause the system to:
receive, from a first device, first audio data corresponding to a first spoken utterance;
perform speech processing on the first audio data to generate first text data;
determine the first text data corresponds to a browse request including a browse topic encompassing multiple related content;
determine a plurality of output devices associated with the first device;
determine, from among the plurality of output devices, a second device is associated with a first output template, the first output template indicating how browse results are to be presented via a display of the second device;
based at least in part on determining the second device is associated with the first output template, determine that the second device is to output results of the browse request;
send, to a content source, a first data request that includes information specific to the browse topic and the first output template;
receive, from the content source, first results data specific to the browse topic and including first visual data specific to the first output template;
cause the second device to present at least a portion of the first results data;
receive, from the first device, second audio data corresponding to a second spoken utterance;
perform speech processing on the second audio data to generate second text data;
determine the second text data corresponds to a search request including a search topic specific to a particular item;
determine the second device is associated with a second output template, the second output template indicating how search results are to be presented via the display, the second output template and the first output template indicating different information to be presented via the display;
based at least in part on determining the second device is associated with the second output template, determine that the second device is to output results of the search request;
send, to the content source, a second data request that includes information specific to the search topic and the second output template;
receive, from the content source, second results data specific to the search topic and including second visual data specific to the second output template; and
cause the second device to present at least a portion of the second results data.

6. The system of claim 5, wherein the instructions, when executed by the at least one processor, causing the system to determine the second text data corresponds to the search request further include instructions to:
determine a field of a data structure of the content source, the field being used for querying the content source; and
associate a first portion of the second text data with the field.

7. The system of claim 5, wherein the instructions, when executed by the at least one processor, further cause the system to:
generate metadata including a command representing how the at least a portion of the first results data is to be presented based on the first output template; and
send the first results data to the second device; and
send the metadata to the second device.

8. The system of claim 5, wherein the instructions, when executed by the at least one processor, further cause the system to:
receive, from the first device, third audio data;
determine the third audio data corresponds to a request to refine presentment of the at least a portion of the first results data; and
cause the second device to present a refined portion of the at least a portion of the first results data.

9. The system of claim 5, wherein the instructions, when executed by the at least one processor, further cause the system to:
receive, from the first device, third audio data;
determine the third audio data corresponds to a request to present additional results associated with the browse topic; and cause the second device to present at least a second portion of the first results data missing from the at least a portion of the first results data.

10. The system of claim 9, wherein the instructions, when executed by the at least one processor, further cause the system to:
determine the additional results were missing from the first results data received from the content source;
send, to the content source, a third data request that includes information specific to the additional results;
receive, from the content source, additional results data; and
cause the second device to present the additional results data.

11. The system of claim 9, wherein the instructions, when executed by the at least one processor, further cause the system to:
determine the additional results were included in the first results data received from the content source;
determine the additional results were missing from the at least a portion of the first results data; and
cause the second device to present at least a second portion of the first results data corresponding to the additional results.

12. The system of claim 5, wherein the instructions, when executed by the at least one processor, further cause the system to:
determine user profile data, associated with the first device, represents a plurality of content sources including the content source; and
determined the user profile data represents the plurality of output devices.

13. A computer-implemented method comprising:
receiving, from a first device, first audio data corresponding to a first spoken utterance;
performing speech processing on the first audio data to generate first text data;
determining the first text data corresponds to a browse request including a browse topic encompassing multiple related content;
determining a plurality of output devices associated with the first device;
determining, from among the plurality of output devices, a second device is associated with a first output template, the first output template indicating how browse results are to be presented via a display of the second device;
based at least in part on determining the second device is associated with the first output template, determining that the second device is to output results of the browse request;
sending, to a content source, a first data request that includes information specific to the browse topic and the first output template;
receiving, from the content source, first results data specific to the browse topic and including first visual data specific to the first output template;
causing the second device to present at least a portion of the first results data;
receiving, from the first device, second audio data corresponding to a second spoken utterance;
performing speech processing on the second audio data to generate second text data;
determining the second text data corresponds to a search request including a search topic specific to a particular item;

determining the second device is associated with a second output template, the second output template indicating how search results are to be presented via the display, the second output template and the first output template indicating different information to be presented via the display;
based at least in part on determining the second device is associated with the second output template, determining that the second device is to output results of the search request;
sending, to the content source, a second data request that includes information specific to the search topic and the search output template;
receiving, from the content source, second results data specific to the search topic and including second visual data specific to the second output template; and
causing the second device to present at least a portion of the second results data.

14. The computer-implemented method of claim 13, wherein determining the second text data corresponds to the search request comprises:
determining a field of a data structure of the content source, the field being used for querying the content source; and
associating a first portion of the second text data with the field.

15. The computer-implemented method of claim 13, further comprising:
generating metadata including a command representing how the at least a portion of the first results data is to be presented based on the first output template;
sending the first results data to the second device; and
sending the metadata to the second device.

16. The computer-implemented method of claim 13, further comprising:
receiving, from the first device, third audio data;
determining the third audio data corresponds to a request to refine presentment of the at least a portion of the first results data; and
causing the second device to present a refined portion of the at least a portion of the first results data.

17. The computer-implemented method of claim 13, further comprising:
receiving, from the first device, third audio data;
determining the third audio data corresponds to a request to present additional results associated with the browse topic; and
causing the second device to present at least a second portion of the first results data missing from the at least a portion of the first results data.

18. The computer-implemented method of claim 17, further comprising:
determining the additional results were missing from the first results data received from the content source;
sending, to the content source, a third data request that includes information specific to the additional results;
receiving, from the content source, additional results data; and
causing the second device to present the additional results data.

19. The computer-implemented method of claim 17, further comprising:
determining the additional results were included in the first results data received from the content source;
determining the additional results were missing from the at least a portion of the first results data; and causing the second device to present at least a second portion of the first results data corresponding to the additional results.

20. The computer-implemented method of claim 13, further comprising:
 determining user profile data, associated with the first device, represents a plurality of content sources including the content source; and
 determining, in the user profile data represents the plurality of output devices.

* * * * *